United States Patent
Tomono et al.

(10) Patent No.: US 11,409,306 B2
(45) Date of Patent: Aug. 9, 2022

(54) MOVEMENT ROBOT

(71) Applicant: Chiba institute of technology, Chiba (JP)

(72) Inventors: Masahiro Tomono, Chiba (JP); Kiyoshi Irie, Chiba (JP); Hideaki Yamato, Chiba (JP); Masaharu Shimizu, Chiba (JP); Shunji Yamanaka, Chiba (JP); Takayuki Furuta, Chiba (JP)

(73) Assignee: CHIBA INSTITUTE OF TECHNOLOGY, Chiba (JP)

( * ) Notice: Subject to any disclaimer, the term of this patent is extended or adjusted under 35 U.S.C. 154(b) by 0 days.

(21) Appl. No.: 16/621,073

(22) PCT Filed: Aug. 14, 2018

(86) PCT No.: PCT/JP2018/030271
§ 371 (c)(1),
(2) Date: Dec. 10, 2019

(87) PCT Pub. No.: WO2020/035902
PCT Pub. Date: Feb. 20, 2020

(65) Prior Publication Data
US 2021/0365040 A1 Nov. 25, 2021

(51) Int. Cl.
*G05D 1/02* (2020.01)
(52) U.S. Cl.
CPC ........... *G05D 1/0274* (2013.01); *G05D 1/024* (2013.01); *G05D 1/0219* (2013.01); *G05D 2201/0203* (2013.01)
(58) Field of Classification Search
CPC .. G05D 1/0251; G05D 1/0274; G05D 1/0214; G05D 1/0221; G05D 1/024;
(Continued)

(56) References Cited

U.S. PATENT DOCUMENTS

| 9,483,055 B2 | 11/2016 | Johnson et al. |
| 9,682,481 B2 | 6/2017 | Lutz et al. |

(Continued)

FOREIGN PATENT DOCUMENTS

| CN | 104302218 A | 1/2015 |
| CN | 205942412 U | 2/2017 |

(Continued)

OTHER PUBLICATIONS

European Search Report dated Dec. 4, 2020 issued in European Patent Application No. 18922101.3.
(Continued)

*Primary Examiner* — Ryan Rink
(74) *Attorney, Agent, or Firm* — Pearne & Gordon LLP

(57) ABSTRACT

Provided is a movement robot configured so that various types of operation can be executed according to motion of other objects or a movement body and a utilization area can be expanded accordingly. The movement robot includes a robot body 1, a control unit 2, a traveling unit 3, and a detection unit 4. The control unit 2 includes a storage section 30 configured to store detection information detected by the detection unit 4 in chronological order, a map production section 25 configured to produce a map of the periphery of the robot body 1, a movement body detection section 291 configured to detect a movement body 100 different from the robot body 1, a route control section 26 configured to associate the map with robot route information 32 indicating a movement route of the robot body 1 and movement body route information 33 indicating a movement route of the movement body 100, and an coordinated movement control section 28 configured to move the robot body 1 in coordination with the movement body 100 based on the robot route information 32 and the movement body route information 33.

10 Claims, 14 Drawing Sheets

(58) Field of Classification Search
CPC .. G05D 1/0246; G05D 1/0253; G05D 1/0255; G05D 1/027; G05D 1/0272; G05D 2201/0203; G05D 2201/0206; G05D 2201/0215
See application file for complete search history.

(56) References Cited

U.S. PATENT DOCUMENTS

| | | |
|---|---|---|
| 10,162,359 B2 | 12/2018 | Johnson et al. |
| 10,671,088 B2 | 6/2020 | Lutz et al. |
| 11,330,948 B2 | 5/2022 | Noh et al. |
| 2005/0216126 A1* | 9/2005 | Koselka ............... B25J 9/0003 700/259 |
| 2010/0222925 A1 | 9/2010 | Anezaki |
| 2012/0197464 A1* | 8/2012 | Wang .................... B25J 5/00 701/2 |
| 2014/0039676 A1 | 2/2014 | Jeffry et al. |
| 2014/0188325 A1 | 7/2014 | Johnson et al. |
| 2016/0274589 A1* | 9/2016 | Templeton ............ G01S 7/4802 |
| 2017/0023942 A1 | 1/2017 | Johnson et al. |
| 2017/0113352 A1 | 4/2017 | Lutz et al. |
| 2017/0116487 A1* | 4/2017 | Yamazaki ............... G06T 7/285 |
| 2017/0248966 A1 | 8/2017 | Lutz et al. |
| 2017/0358201 A1* | 12/2017 | Govers ................ G05D 1/0248 |
| 2018/0178382 A1* | 6/2018 | Lalonde ............... G05D 1/0297 |
| 2018/0181136 A1* | 6/2018 | Loosararian ........... G01B 7/105 |
| 2019/0254490 A1 | 8/2019 | Marutani et al. |
| 2019/0320867 A1 | 10/2019 | Noh et al. |
| 2020/0282549 A1* | 9/2020 | Torii ..................... B25J 9/1682 |
| 2021/0009349 A1* | 1/2021 | Cohen ................ G05B 19/4155 |
| 2021/0109520 A1* | 4/2021 | Cao ..................... B25J 13/089 |
| 2021/0156697 A1* | 5/2021 | Wu ......................... G06T 7/50 |
| 2021/0165421 A1* | 6/2021 | Ko ....................... B25J 19/005 |
| 2021/0172741 A1* | 6/2021 | Liu ........................ G01C 21/20 |
| 2021/0255646 A1* | 8/2021 | Weiss ................... G05D 1/0212 |
| 2021/0264617 A1* | 8/2021 | Dwivedi ................ G06T 7/246 |
| 2021/0294330 A1* | 9/2021 | Ko ...................... G05D 1/0219 |
| 2022/0074762 A1* | 3/2022 | Artes ................... G05D 1/0214 |

FOREIGN PATENT DOCUMENTS

| | | |
|---|---|---|
| JP | 2008-282073 A | 11/2008 |
| JP | 2016-073630 A | 5/2016 |
| JP | 2017-059217 A | 3/2017 |
| JP | 2017-157087 A | 9/2017 |
| JP | 2018-049438 A | 3/2018 |
| TW | 201729023 A | 8/2017 |
| TW | 2018-17361 A | 5/2018 |
| TW | 201825037 A | 7/2018 |
| WO | 2015/193941 A1 | 12/2015 |
| WO | 2017/030188 A1 | 2/2017 |

OTHER PUBLICATIONS

International Search Report dated Nov. 6, 2018 filed in PCT/JP2018/030271.

Office Action dated Apr. 30, 2022 for the corresponding Taiwanese Patent Application No. 109137520.

* cited by examiner

FIG. 7
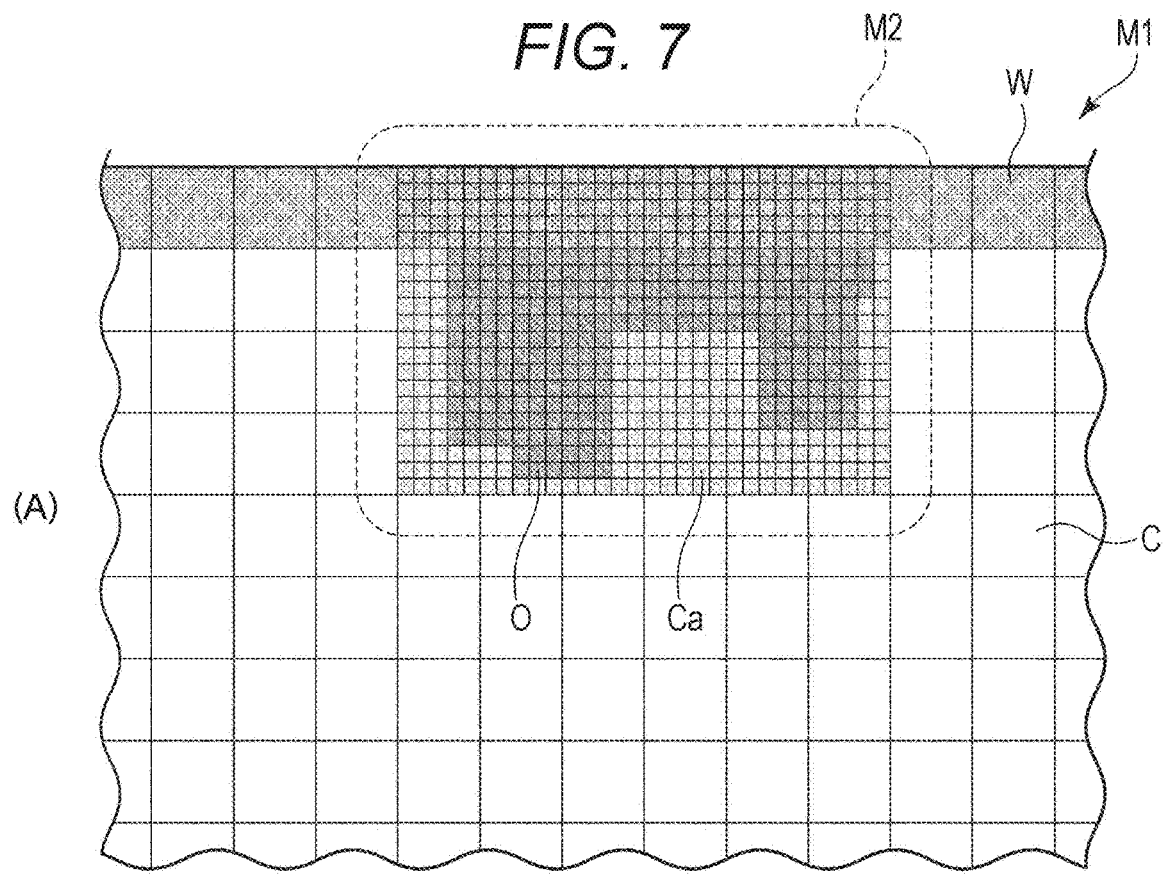
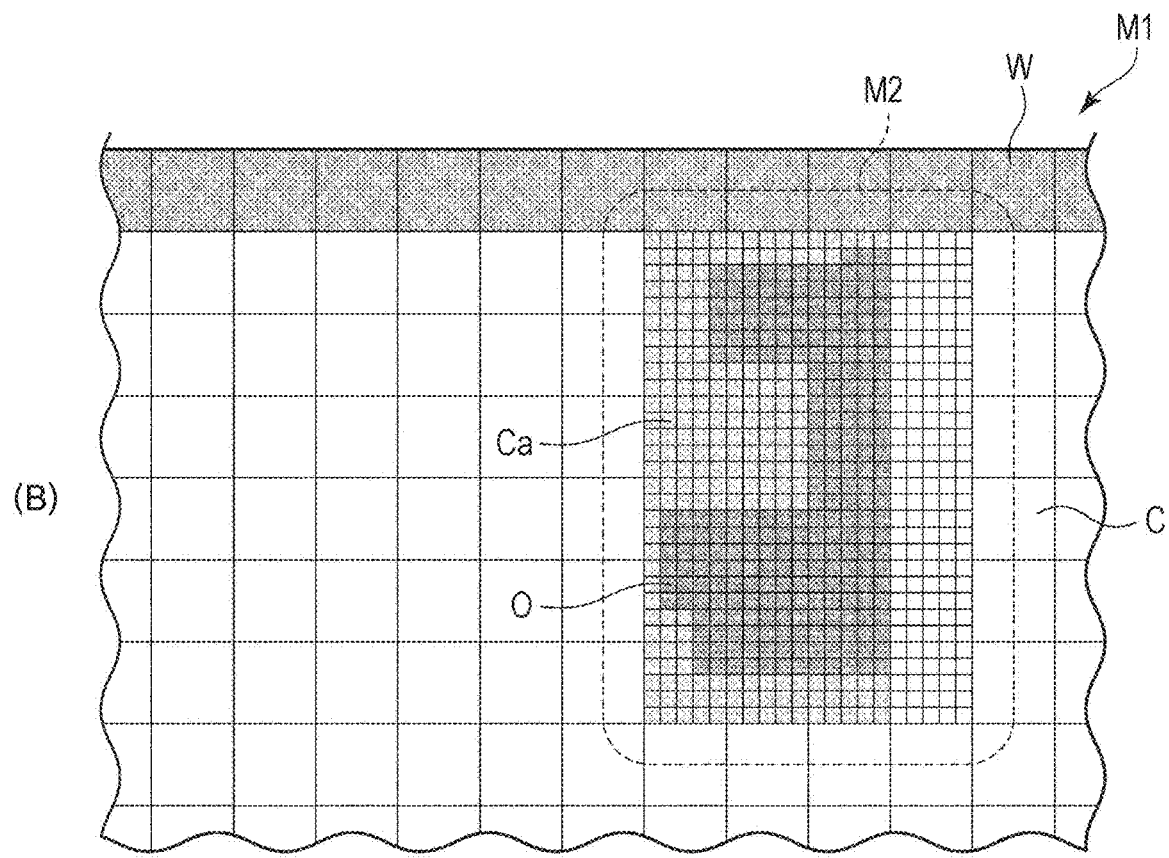

MOVEMENT ROBOT

TECHNICAL FIELD

The present invention relates to a self-propelling movement robot.

BACKGROUND ART

Typically, self-propelling movement robots such as a service robot and a home robot, specifically various movement robots such as a cleaning robot, a security robot, a transport robot, a guide robot, a nursing-care robot, and an agricultural robot, have been in practical use. Such a movement robot includes a movement unit configured to move a robot body, a detection unit configured to detect a distance to a surrounding object in a movement area of the robot body and the direction of the object, and a control unit configured to control the movement unit and the detection unit.

A technique called simultaneous localization and mapping (SLAM) for self-location estimation and environmental map production has been used as the technique of self-propelling the movement robot. An occupancy grid map produced based on the presence or absence of an object in a movement area of the movement robot is sometimes used as an environmental map (see, e.g., Patent Literature 1). The occupancy grid map is configured such that a plane or a space of the movement area is divided into multiple sections (cells) and is stored and a cell value corresponding to the presence or absence of the object is provided to each divided section.

The movement robot estimates a self-location by the SLAM technique, and determines the presence or absence of the object based on the cell value of the produced occupancy grid map to set a movement route for self-propelling. That is, a section where the object is present is set as a non-passable section, and the movement route is set for a region where sections without the presence of the object are continued and the robot body can pass. Movement route information is stored in association with the occupancy grid map. However, the objects include, for example, not only normally-unmovable stationary bodies such as walls and columns of buildings, stationary furniture, and stationary objects, but also movable bodies such as compact furniture, goods, and items moved by persons or movement bodies such as self-moving persons, animals, automobiles, and other movement robots.

The technique of identifying a person (a target person) as a movement body and sensing the location of the target person, setting a movement route to the target person on a map, and following the target person according to the set route has been proposed (see, e.g., Patent Literature 2). A movement robot (a self-moving device) described in Patent Literature 2 is a nursing-care, pet, security-surveillance, or indoor-cleaning robot following the target person, and is configured to determine the target person based on an image captured by an image capturing unit and calculate, in the case of the target person, an optimal movement route to the location of the target person to follow the target person according to the movement route.

CITATION LIST

Patent Literature

Patent literature 1: JP-A-2017-157087
Patent literature 2: JP-A-2018-49438

SUMMARY

Problems to be Solved by the Invention

However, the typical movement robot as described in Patent Literature 2 stores, as a point (coordinates) on the map, the location of the movement body as the follow-up target person, and moves along the movement route toward such a point. Such a movement robot cannot perform optional operation according to a movement route in a case where the movement body has moved. For this reason, it is difficult for the typical movement robot to perform various types of operation in response to the movement body performing various types of motion, and a utilization area of the robot is limited.

An object of the present invention is to provide a movement robot configured so that various types of operation can be executed according to motion of a movement body and a utilization area can be expanded accordingly.

Solutions to the Problems

The movement robot of the present invention is a movement robot including a robot body, a movement unit configured to move the robot body, a detection unit configured to detect a distance to a surrounding object in a movement area of the robot body and the direction of the object, and a control unit configured to control the movement unit and the detection unit. The control unit includes a storage section configured to store detection information detected by the detection unit in chronological order, a map production section configured to produce a map of the periphery of the robot body based on the detection information stored in the storage section to store the map in the storage section, a movement body detection section configured to detect a movement body different from the robot body, a robot route information storage section configured to associate the map produced by the map production section with robot route information indicating a movement route of the robot body to store the map in the storage section, a movement body route information storage section configured to associate the map produced by the map production section with movement body route information indicating a movement route of the movement body to store the map in the storage section, and a coordinated movement control section configured to move the robot body in coordination with the movement body based on the robot route information and the movement body route information.

According to the present invention, the control unit of the movement robot stores the movement route of the movement robot itself as the robot route information, and stores the movement route of another movement body as the movement body route information. Moreover, the coordinated movement control section moves the robot body in coordination with the movement body based on the robot route information and the movement body route information. Thus, the robot body can be efficiently moved relative to the movement body. Moreover, various types of operation can be executed according to motion of the movement body, and a utilization area of the movement robot can be expanded. The control unit includes the movement body detection section configured to detect the movement body, and therefore, the movement body can be accurately detected and coordinated operation for the movement body can be reliably executed.

In the present invention, the coordinated movement control section preferably moves the robot body by the movement unit such that the movement route of the robot body subsequently overlaps with the movement route of the movement body, thereby causing the robot body to move and follow the movement body.

According to this configuration, the coordinated movement control section moves the robot body such that the robot body subsequently overlaps with the movement route of the movement body, thereby causing the robot body to follow the movement body. Thus, the follow-up operation of following the movement body from the back thereof can be executed by the robot body. That is, the movement robot does not merely move toward the movement body, but moves to follow along a route in which the movement body has moved. Thus, e.g., a work coordinated with the movement body can be executed.

In the present invention, the coordinated movement control section preferably moves the robot body by the movement unit such that the movement route of the robot body does not overlap with the movement route of the movement body, thereby moving the robot body in a predetermined movement region such that a work is divided between the robot body and the movement body.

According to this configuration, the coordinated movement control section moves the robot body such that the robot body does not overlap with the movement route of the movement body, thereby moving the robot body in the predetermined movement region such that the work is divided between the robot body and the movement body. Thus, task division operation not overlapping with movement of the movement body can be executed by the robot body. That is, in the predetermined movement region, the robot body moves in a route different from a route in which the movement body has moved (or is moving), and therefore, coordinated operation can be performed while the task is divided between the movement body and the robot body.

In the present invention, the coordinated movement control section preferably determines whether or not the movement route of the movement body subsequently overlaps with the movement route of the robot body, and in a case where it is determined that the movement route of the movement body overlaps with the movement route of the robot body, preferably moves the robot body by the movement unit such that the robot body leads the movement body.

According to this configuration, the coordinated movement control section causes the robot body to move and lead the movement body such that the movement body moves to subsequently overlap with the movement route of the robot body, and therefore, the leading operation of leading the movement body can be executed by the robot body. That is, the robot body is moved while it is determined that the movement body follows the robot body, and therefore, the work coordinated with the movement body can be executed while the robot body is leading the movement body.

In the present invention, the control unit preferably includes an object change detection section configured to compare a new map produced by the map production section and an old map stored in the storage section to detect a change in the presence or absence of the object at the periphery of the robot body.

According to this configuration, the object change detection section compares the new map and the old map to detect a change in the presence or absence of the object at the periphery of the robot body, and therefore, operation of the robot body can be changed corresponding to a change in the movement area. For example, in a case where a worker has moved a movable body as a movable object, a region where the movable body cannot pass becomes a passable region, and therefore, the robot body can be moved through such a region.

In the present invention, the map production section preferably produces a low-resolution broad wide area map associated with the robot route information and the movement body route information and a high-resolution narrow area map used for detecting a change in the presence or absence of the object at the periphery of the robot body by the object change detection section.

According to this configuration, the map production section produces the wide area map and the narrow area map. Thus, while the entirety of the movement area can be recognized based on the low-resolution broad wide area map associated with the robot route information and the movement body route information, a change in the presence or absence of the surrounding object can be reliably detected based on the high-resolution narrow area map used for detecting a change in the presence or absence of the object at the periphery of the robot body by the object change detection section. Moreover, a large amount of the narrow area map having a smaller data amount than that of the wide area map can be stored in the storage section.

In the present invention, the control unit preferably includes a working region information storage section configured to associate the map produced by the map production section with working region information indicating a workable region to store the map in the storage section, and a working region information change detection section configured to compare the new map produced by the map production section and the old map stored in the storage section to detect a change in the working region information.

According to this configuration, the working region information storage section stores, in the storage section, the working region information indicating the workable region in association with the map, and the working region information change detection section compares the new map and the old map to detect a change in the working region information. Thus, operation of the robot body can be changed corresponding to a change in the working region information. For example, in a case where the worker has moved the location of the object, a region where the work cannot be performed so far is changed to the workable region, and therefore, the robot body can be moved by the movement unit such that the work is performed in such a region.

In the present invention, the map production section preferably produces a low-resolution broad wide area map including the robot route information and the movement body route information and a high-resolution narrow area map used for detecting a change in the working region information by the working region information change detection section.

According to this configuration, the map production section produces, in addition to the wide area map, the high-resolution narrow area map used for detecting a change in the working region information by the working region information change detection section, and therefore, a change in the working region information can be reliably detected. Moreover, a large amount of the narrow area map having a smaller data amount than that of the wide area map can be stored in the storage section.

In the present invention, the control unit preferably includes an exceptional region information storage section configured to associate the map produced by the map production section with exceptional region information indicating a region excluded from a work target to store the map in the storage section.

According to this configuration, the exceptional region information storage section stores, in the storage section, the exceptional region information in association with the map, and therefore, operation of the robot body can be changed for the region excluded from the work target by the exceptional region information. For example, in a case where the work has been already performed by the worker in a certain region, the exceptional region information is stored such that such a region is excluded from the work target, and therefore, the robot body can be operated such that the work is not performed in the region.

BRIEF DESCRIPTION OF THE DRAWINGS

FIG. 7 is a conceptual diagram of a narrow area map produced by the movement robot;

DESCRIPTION OF THE EMBODIMENTS

Hereinafter, one embodiment of the present invention will be described based on FIGS. 1 to 16.

Figure 1:
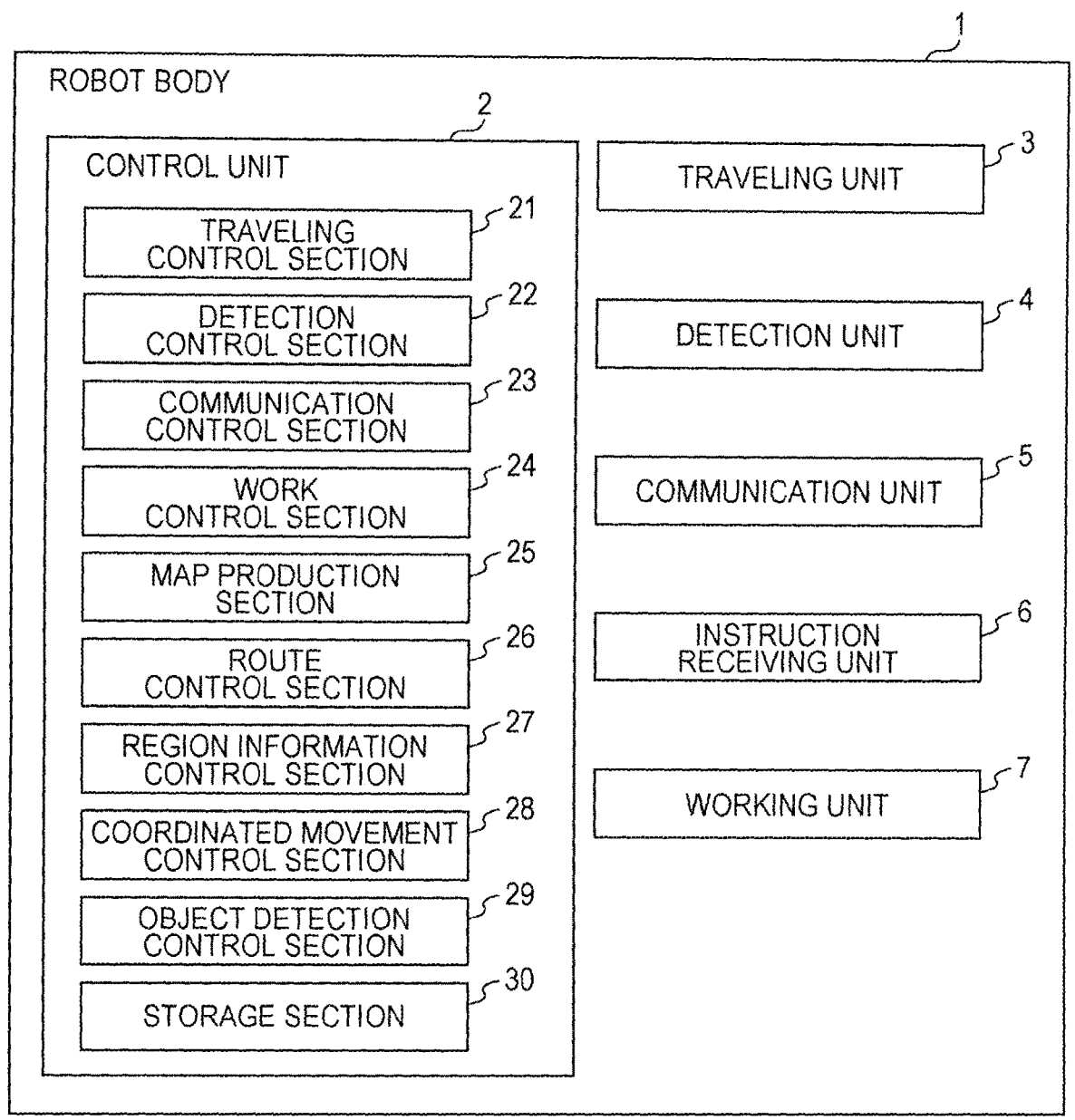
FIG. 1 is a block diagram of a movement robot according to one embodiment of the present invention.

As illustrated in FIG. 1, a movement robot of the present embodiment includes a robot body 1, a control unit 2 configured to drivably control the robot body 1, a traveling unit 3 as a movement unit configured to move the robot body 1, a detection unit 4 configured to detect an object at the periphery of the robot body 1, a communication unit 5 configured to communicate with other types of equipment, an instruction receiving unit 6 configured to receive an instruction from, e.g., other types of equipment, and a working unit 7 configured to perform a work in association with movement of the robot body 1. This movement robot performs self-location estimation and environment map production by a SLAM technique, thereby self-propelling the robot body 1 by the traveling unit 3 based on a map and a traveling schedule for each target space (each movement area) stored in the control unit 2. A later-described occupancy grid map is utilized as this map.

The robot body 1 includes a not-shown body and a not-shown chassis, and for example, the traveling unit 3 includes a pair of right and left wheels and a motor configured to independently rotatably drive the pair of wheels. The communication unit 5 performs bidirectional communication among the robot body 1 and other types of equipment by various wireless communication methods such as Wireless Fidelity (Wi-Fi, a registered trademark), Bluetooth (a registered trademark), and infrared communication, and includes a not-shown antenna, a not-shown infrared emitting section and the like. The communication unit 5 may directly communicate with other types of equipment via a radio wave having a predetermined frequency or infrared light, or may communicate with other types of equipment via a network line such as a local area network (LAN) or a wide area network (WAN) or a wireless or wired telephone network used for a mobile phone or the like.

Other types of equipment communicating with the communication unit 5 as described herein may be, for example, wireless communication devices such as a mobile phone, a smartphone, a tablet terminal, a laptop computer, a PDA, a smartwatch, and a smart speaker, a remote controller configured to transmit or receive a signal via infrared light, or a device connected to the robot body 1 with a wire to communicate with the robot body 1. The instruction receiving unit 6 receives, for example, an instruction via the communication unit 5 by means of signals received from other types of equipment. Moreover, the instruction receiving unit 6 may be a touch sensor type switch provided at the robot body 1, or may include a microphone configured to receive voice and a voice identification unit configured to analyze the voice to discriminate an instruction. Further, the instruction receiving unit 6 may be a unit configured to capture an image of a worker by an image capturing unit such as a camera to analyze operation of the worker based on the captured image, thereby receiving an instruction from the worker.

For example, in a case where the movement robot is a cleaning robot, the working unit 7 is a suction unit configured to suck dust and the like on a floor surface in the target space or a wiping unit configured to wipe down, e.g., the floor surface. In a case where the movement robot is a security robot, the working unit 7 is, for example, an image capturing unit such as a camera configured to capture, e.g., an image of an intruder to the target space, a warning unit configured to issue a warning to the intruder, or a transmission unit configured to transmit a warning to, e.g., other types of equipment via the communication unit 5. In a case where the movement robot is a transport robot, the working unit 7 is a conveyance unit configured to lift and convey a luggage. In a case where the movement robot is a guide robot, the working unit 7 is, for example, a light emitting unit configured to deliver a message to a guide target via light or a voice guide unit configured to deliver the message via voice. In a case where the movement robot is a nursing-care robot, the working unit 7 is, for example, a unit configured to provide motion support to a nursing-care target person or a unit configured to convey an object. In a case where the movement robot is an agricultural robot, the working unit 7 is, for example, a unit configured to cultivate an agricultural land as the target space, spread fertilizer, and pick an agricultural crop. The working unit 7 as described above may be directly provided at the robot body 1, or may include equipment provided separately from the robot body 1.

The detection unit 4 includes, for example, a front sensor provided at a front portion of the robot body 1, an ambient sensor provided at an upper portion of the robot body 1, and a back sensor provided at a back portion of the robot body 1. The ambient sensor is a laser scanner (Light Detection and Ranging or Laser Imaging Detection and Ranging (LIDAR)) configured to irradiate the periphery of the laser scanner with laser light such as infrared laser to measure a distance to an object. This ambient sensor takes, as a reference location $(x, y, \theta)^T$, a sensor center and an orientation as a self-location acquired by the SLAM technique, thereby the presence or absence and location of the object based on a distance from the sensor center and an angle (a direction) about the sensor center. In such object detection (hereinafter sometimes merely referred to as "scan"), a detection value of a single cycle is taken as a single unit (a single scan) based on a laser beam irradiated with a predetermined resolution (e.g., 1°) in a single cycle (e.g., one rotation, 360°) of detection of the ambient sensor, and such a detection value of the single scan is, as detection information, stored in chronological order in a storage section 30.

The control unit 2 includes an arithmetic unit such as a CPU and a storage unit such as a ROM or a RAM, and controls operation of the robot body 1. The control unit 2 includes a traveling control section 21 configured to control the traveling unit 3, a detection control section 22 configured to control the detection unit 4, a communication control section 23 configured to control the communication unit 5, and a work control section 24 configured to control the working unit 7. Further, the control unit 2 includes a map production section 25 relating to production of the later-described occupancy grid map, a route control section (a robot route information storage section, a movement body route information storage section) 26, a region information control section (a working region information storage section) 27, a coordinated movement control section 28, an object detection control section 29, and the storage section 30 configured to store the produced occupancy grid map and various types of data.

Figure 2:
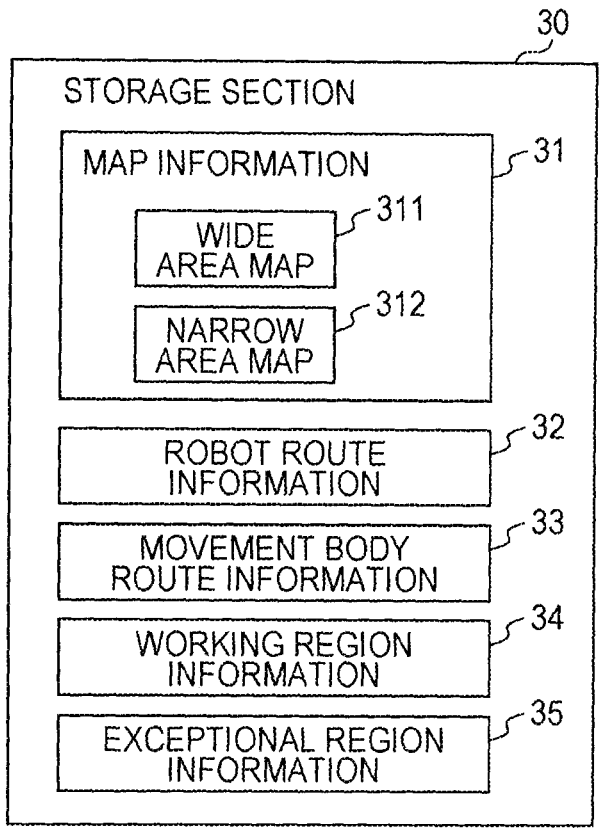
FIG. 2 is a diagram of information stored in a storage section in the movement robot.

FIG. 2 is a diagram of the information stored in the storage section 30 in the movement robot. As illustrated in FIG. 2, the storage section 30 stores, as map information 31 produced by the map production section 25, a wide area map 311 and a narrow area map 312. The wide area map 311 and the narrow area map 312 are the later-described occupancy grid map M, and a new map updated in real time in association with action of the movement robot and a previously-produced old map are stored. Moreover, the storage section 30 stores robot route information 32 and movement body route information 33 produced by the route control section 26. The robot route information 32 indicates a movement route of the robot body 1, and is stored in association with the wide area map 311. The movement body route information 33 indicates a movement route of a movement body 100 (described later) different from the robot body 1, and is stored in association with the wide area map 311. The storage section 30 stores working region information 34 and exceptional region information 35 produced by the region information control section 27.

Figure 3:
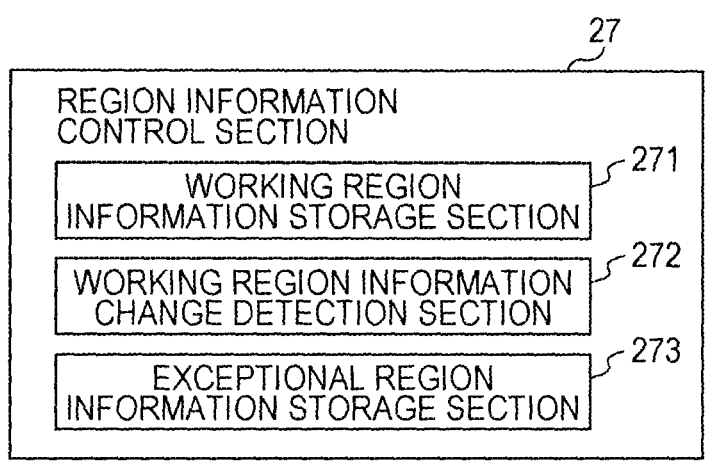
FIG. 3 is a diagram of a region information control section of a control unit in the movement robot.

FIG. 3 is a diagram of the region information control section 27 of the control unit 2 in the movement robot. The region information control section 27 includes a working region information storage section 271, a working region information change detection section 272, and an exceptional region information storage section 273. The working region information storage section 271 associates the wide area map 311 and the narrow area map 312 with the working region information 34 indicating a workable region, thereby storing such information in the storage section 30. The working region information change detection section 272 compares the old map and the new map based on the wide area map 311 and the narrow area map 312 to detect a change in the working region information 34, and the working region information storage section 271 updates the working region information 34 based on a detection result. The exceptional region information storage section 273 associates the wide area map 311 and the narrow area map 312 with the exceptional region information 35 indicating a region excluded from a work target, thereby storing such information in the storage section 30.

Figure 4:
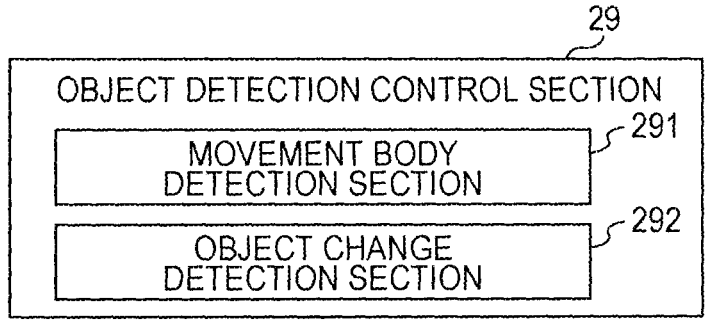
FIG. 4 is a diagram of an object detection control section of the control unit.

FIG. 4 is a diagram of the object detection control section 29 of the control unit 2. The object detection control section 29 includes a movement body detection section 291 and an object change detection section 292. The movement body detection section 291 detects, as the movement body 100, a self-moving object among objects detected at the periphery of the robot body 1 by the detection unit 4 based on the wide area map 311 and the narrow area map 312, thereby transferring information on the detected movement body 100 to the route control section 26 to store such information as the movement body route information 33 in association with the occupancy grid map M. The object change detection section 292 compares the old map and the new map based on the wide area map 311 and the narrow area map 312 to detect a change in the object at the periphery of the robot body 1, thereby identifying, as a movable body, the object moved by, e.g., a person and transferring a change in a working region due to movement of the movable body to the working region information storage section 271 to cause the working region information storage section 271 to update the working region information 34.

Figure 5:
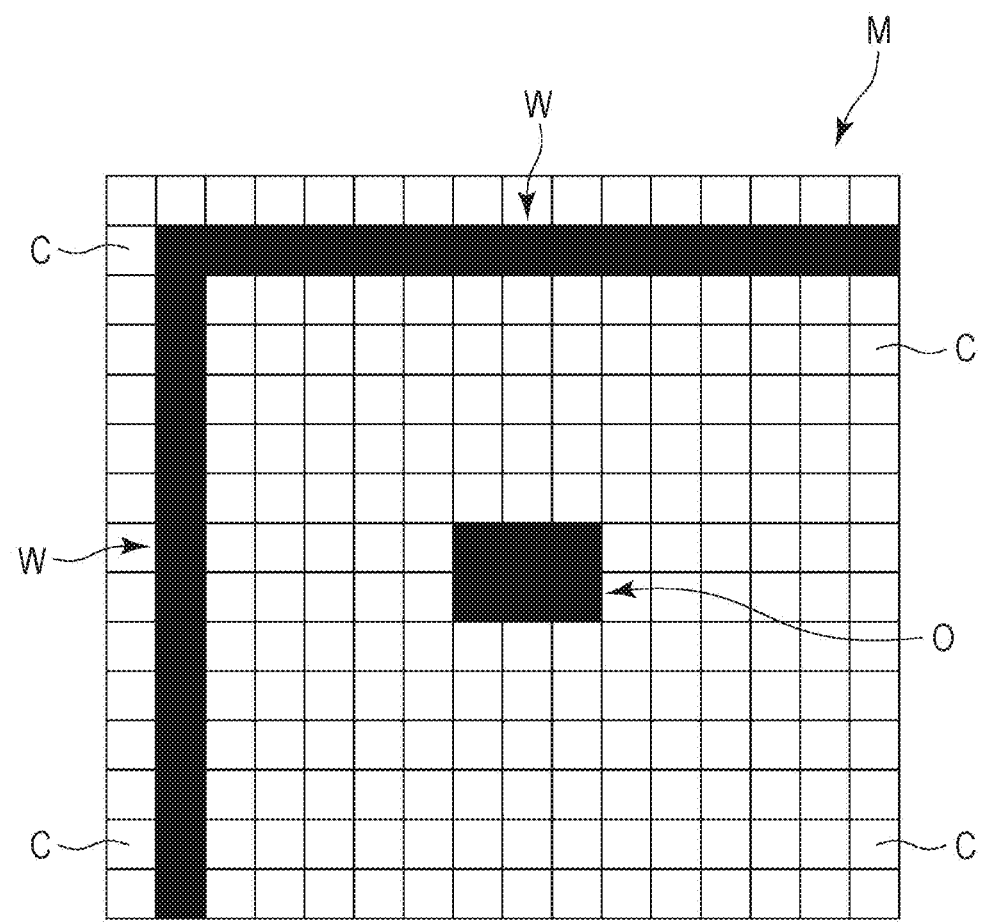
FIG. 5 is a conceptual diagram of a true value of an occupancy grid map indicating a movement area of the movement robot.
Figure 6:
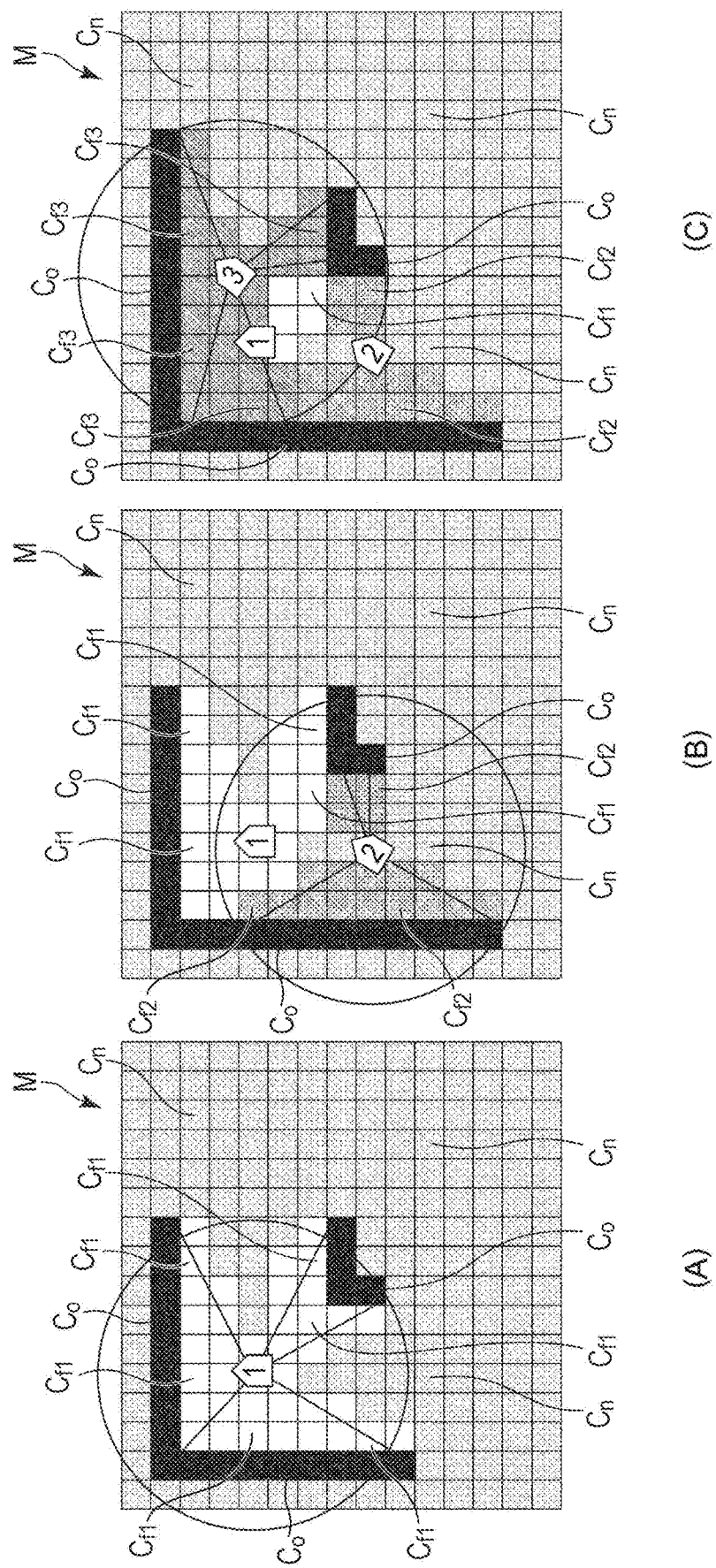
FIG. 6 is a conceptual diagram of the process of producing the occupancy grid map.

Next, a basic concept relating to production of the occupancy grid map will be described with reference to FIGS. 5 and 6. FIG. 5 is a conceptual diagram of a true value of the occupancy grid map M indicating the movement area of the movement robot, and FIG. 6 is a conceptual diagram of the process of producing the occupancy grid map M. The occupancy grid map M defines the target space in a two-dimensional plane, such a plane is divided into grids with a predetermined size (e.g., 5 cm square), and a cell value (a section value) is set for each cell C as a divided section. For example, ray casting is standard as the method for producing the occupancy grid map M, and the procedure of producing the occupancy grid map M by means of ray casting will be described below.

In ray casting, a line representing the laser beam is extended from the sensor center, and the value of the cell C through which the beam has passed is updated. As illustrated in FIG. 6, when a measurement area of the laser scanner (the ambient sensor) is within a circle, the cell C at a location at which the beam contacts the object s occupied (e.g., the cell value=1), and the cell C through which the beam has passed is free (e.g., the cell value=−1). In a case where no object is within the measurement area, no beam returns. Thus, such a case is taken as no observation, and the cell value is not changed in normal cases. The cell value of the occupancy grid map M is managed with logarithmic odds, and the cell values obtained by multiple scans are combined to calculate the logarithmic odds. For example, when a certain cell C is taken as occupied three times and is taken as free twice, the logarithmic odds are 3+(−2)=1. An occupancy probability is calculated from such logarithmic odds. Note that in FIG. 6, the cell value is merely overpainted for the sake of simplicity in illustration.

Next, a concept in the method for producing the occupancy grid map M in the present invention will be described with reference to FIGS. 5 and 6. FIG. 5 is the true value of the occupancy grid map M, and assumes that walls W and an object O are present in actual environment. FIG. 6(A) is the cell value of the occupancy grid map M when the control unit 2 performs a first scan (a scan of 360°) by the detection unit 4. In this case, a free cell Cf1 by the first scan is indicated as white. Similarly, FIGS. 6(B) and 6(C) are the cell values by a second scan and a third scan, and free cells Cf2, Cf3 by these scans are each indicated as medium gray and dark gray. In FIG. 6, any occupied cell Co is indicated as black, and a non-observed cell Cn is indicated as light gray. In each scan, multiple laser beams (e.g., a single beam for 1°, i.e., the total of 360 beams) are irradiated, and for the cell through which each laser beam has passed, the cell value is calculated with the logarithmic odds as described above.

The occupancy grid map M needs to be updated as needed to reflect an environmental change, and various forms of an update frequency, such as the case of performing update based on actual time and the case of regularly performing update every day, are conceivable. Moreover, for decreasing map shape distortion and holding consistency, loop closure needs to be performed. A loop described herein is an orbiting route in which the movement robot passes the same location, and the processing of detecting the loop to eliminate map distortion is called loop closure. Specifically, a loop of a traveling trajectory of the movement robot is detected, and the loop closure is performed by pose adjustment. The pose adjustment is a technique performed using a pose graph indicating a constraint relationship of the location of the movement robot, and the pose graph includes a node indicating the location of the movement robot and an arc indicating a relative location between the nodes and can indicate a deviation between an estimated location of the movement robot and a measurement value. In the pose adjustment, such a deviation is minimized, and therefore, map distortion is corrected.

The occupancy grid map M produced as described above and the node and the arc as the route information are, as the map information 31, stored in the storage section 30. The new map produced and updated in real time in association with action of the movement robot and the previously-produced and -stored old map are present as the map information 31. At proper time intervals, the old map remains in association with time. The old map includes information such as an object present in the target space (or present previously). Of the map information 31 illustrated in FIG. 2, the wide area map 311 includes the cell values for the cells C across the entirety of the target space, and is associated with the robot route information 32 and the movement body route information 33. Of the map information 31, the narrow area map 312 is, on the other hand, a map for storing details of a change in the movable body as the object at the periphery of the robot body 1 and the working region, such as a change in a shape, existence or non-existence, and movement, and is utilized for the object change detection section 292 and the working region information change detection section 272.

FIG. 7 is a conceptual diagram of the narrow area map produced by the movement robot. As illustrated in FIG. 7, in an occupancy grid map M1 as the wide area map 311, an occupancy grid map M2 as the narrow area map 312 is produced for limited cells C at the periphery of the object O present in part of the occupancy grid map M1. The cells C of the occupancy grid map M1 are divided into relatively-coarse grids (e.g., grids with 5 cm square), and on the other hand, the cell value is set for each cell Ca divided as a fine grid (e.g., a grid with 1 cm square) in the occupancy grid map M2. In the occupancy grid map M2, the free cell or the occupied cell is defined for each cell Ca, and therefore, the shape of the object O can be expressed in detail. In a case where the object O moves over time, i.e., a case where the object O at a location illustrated in FIG. 7(A) has moved to a location illustrated in FIG. 7(B), the original occupancy grid map M2 is deleted or remains as the old map (the narrow area map 312), and an occupancy grid map M2 at a new location is produced and stored as the narrow area map 312 in the storage section 30. As described above, the occupancy grid map M2 (the narrow area map 312) is produced as needed, and with reference to the narrow area map 312, the object change detection section 292 and the working region information change detection section 272 can detect a change in movement of the object O (the movable body) and the working region information 34 in real time.

Figure 8:
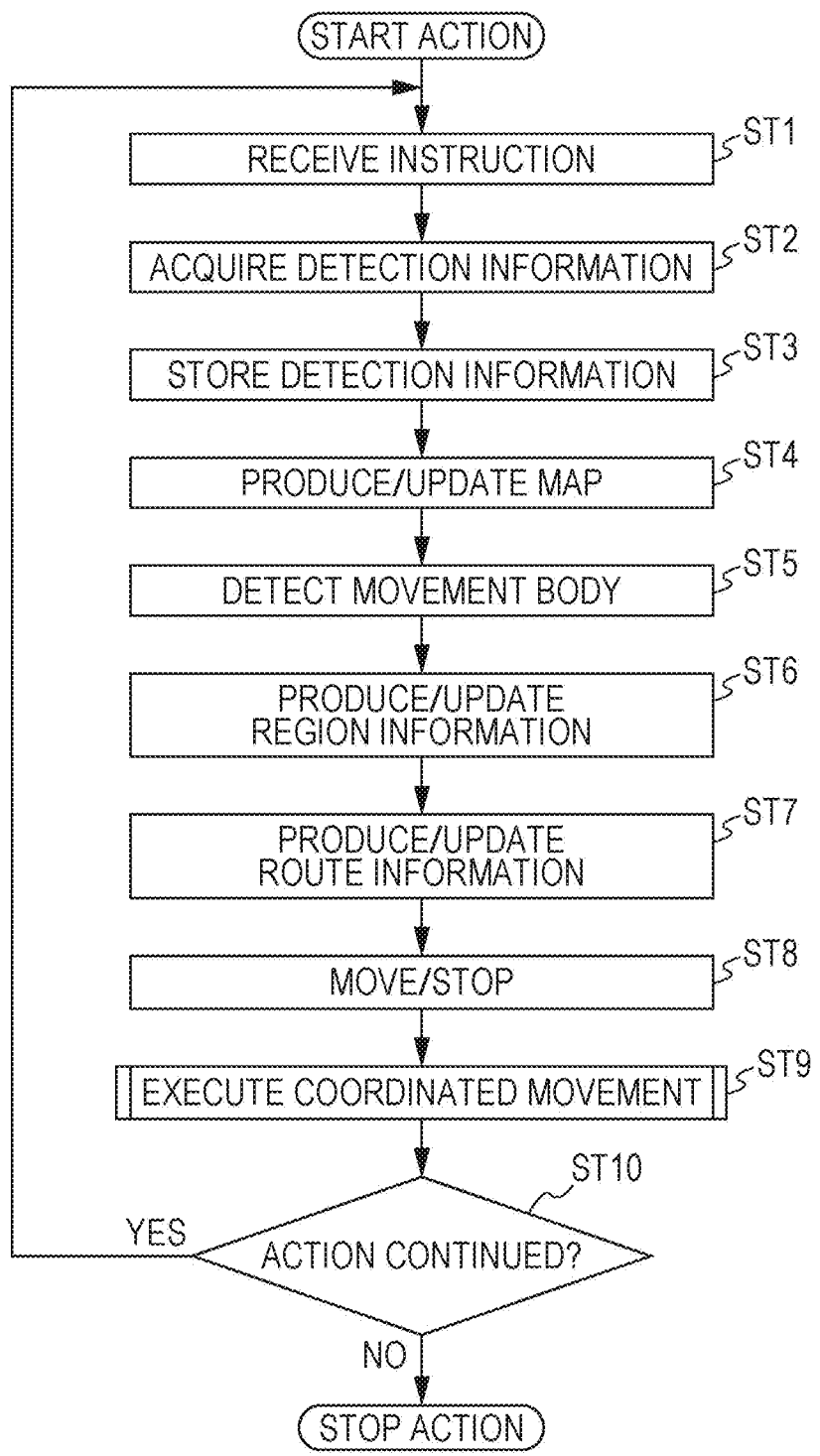
FIG. 8 is a flowchart of operation of the movement robot.

Next, operation of the movement robot will be also described in detail with reference to FIG. 8. FIG. 8 is a flowchart of operation of the movement robot. The movement robot repeats steps ST1 to ST10 illustrated in FIG. 8 in a predetermined cycle (e.g., a short time of about one second) to produce/update the occupancy grid map M of the target space while the traveling unit 3 is self-propelling the movement robot based on the produced occupancy grid map M and the movement robot is performing the work by means of the working unit 7.

The movement robot receives an instruction from a user or other types of equipment by the instruction receiving unit 6 at the start of action (an instruction receiving step: the step ST1). The instruction received at this instruction receiving step (the step ST1) may be an instruction regarding any movement mode of a follow-up operation mode, a task division operation mode, and a leading operation mode executed in later-described coordinated movement, or may be an instruction for executing an individual operation mode. The method for receiving the instruction from the user by the instruction receiving unit 6 may be a method in which the instruction receiving unit 6 determines instruction contents based on signals received from other types of equipment by the communication unit 5, a method in which an instruction via voice is received in a case where the instruction receiving unit 6 is the microphone, or a method in which an instruction via, e.g., gestures is received in a case where the instruction receiving unit 6 is the camera. The instruction receiving unit 6 determines the received instruction to transfer such an instruction to the control unit 2, and the control unit 2 causes the storage section 30 to store instruction information. Note that in a case where no instruction is received at the instruction receiving step (the step ST1), the control unit 2 does not execute the later-described steps ST8, ST9, and controls the robot body 1 to repeatedly execute the steps ST2 to ST7.

After the instruction receiving step (the step ST1), the control unit 2 drivably controls the ambient sensor by the detection control section 22 to detect the object therearound, thereby acquiring the detection information (a detection information acquisition step: the step ST2). Moreover, the control unit 2 estimates the self-location by the SLAM technique while causing the storage section 30 to store, as the detection information, the detection value detected by the ambient sensor in association with the self-location (a detection information storage step: the step ST3). For the detection information, the detection value of the single cycle by the ambient sensor is taken as the single scan, and such a single scan is stored as a single piece of detection information in the storage section 30. Next, the control unit 2 causes the map production section 25 to produce the occupancy grid map M based on the detection information stored in the storage section 30 (a map production/updating step: the step ST4), and causes the storage section 30 to store the produced occupancy grid map M. At this map production/updating step (the step ST4), the occupancy grid map M1 of the entirety of the target space is produced, and is stored as the wide area map 311 in the storage section 30. In addition, according to a change in the presence or absence and movement of the movable body and the region, the high-resolution occupancy grid map M2 is produced for the periphery of the movable body and the changed region, and is stored as the narrow area map 312 in the storage section 30.

Next, the control unit 2 causes the object detection control section 29 to detect the object at the periphery of the robot body 1. The movement body detection section 291 detects the movement body 100 (a movement body detection step: the step ST5), and the object change detection section 292 discriminates the movable body from an object change. At the movement body detection step (the step ST5), the movement body detection section 291 and the object change detection section 292 compare the new occupancy grid maps M1, M2 produced by the map production section 25 and the old occupancy grid maps M1, M2 stored in the storage section 30, thereby detecting a change in the presence or absence of the object at the periphery of the robot body 1. The new map and the old map are compared as described above to obtain a difference between these maps by arithmetic processing. In this manner, the movement body detection section 291 detects the movement body 100, and the object change detection section 292 discriminates the presence or absence and movement of the movable body. The movement body detection section 291 discriminates whether or not the object is continuously moving, and discriminates the continuously-moving object as the movement body 100. The object change detection section 292 detects that the object stops after having appeared or moved or is no longer present, discriminates whether or not such an object state is continued, and discriminates the object stopped after movement as the movable body.

Next, the control unit 2 causes the region information control section 27 to identify the region information for each region of the target space, and causes the storage section 30 to store the region information (a region information production/updating step: the step ST6). Such region information includes, for example, a passable region of the produced occupancy grid map M through which the robot body 1 can pass, a non-passable region through which the robot body 1 cannot pass due to the presence of the wall W or the object O, and an instruction region instructed by the user at the instruction receiving step (the step ST1) as a region in which the work or the movement should not be performed. The region information control section 27 causes the storage section 30 to store each of these types of region information in association with the occupancy grid map M. Moreover, the working region information storage section 271 of the region information control section 27 causes the storage section 30 to store the working region information 34 indicating a region in which the work can be performed using the working unit 7 in association with the occupancy grid map M. As in the above-described object change detection section 292, determination on a change in the working region is made in such a manner that the working region information change detection section 272 compares the old map and the new map to detect a change in the presence or absence of the object. Moreover, the exceptional region information storage section 273 of the region information control section 27 causes the storage section 30 to store the exceptional region information 35 indicating the region excluded from the work target in association with the occupancy grid map M.

Next, the control unit 2 causes the route control section 26 to store, in the storage section 30, the robot route information 32 indicating the movement route of the robot body 1 in the target space and to store, in the storage section 30, the movement body route information 33 indicating the movement route of the movement body 100 different from the robot body 1 (a route information production/updating step: the step ST7). The robot route information 32 is based on the occupancy grid map M produced as described above and various types of region information (the working region information 34, the exceptional region information 35, or the like.). The route control section 26 takes, as arithmetic parameters, a location relationship with respect to the movement body 100 according to the movement mode and the movement speed/direction of the movement body 100 or the like to perform arithmetic processing, and in this manner, a route in which the robot body 1 is efficiently movable is calculated. The movement body route information 33 is calculated in such a manner that the route control section 26 performs arithmetic processing as needed based on movement of the movement body 100 detected by the movement body detection section 291 at the above-described movement body detection step (the step ST5). Moreover, based on the calculated movement body route information 33, the route control section 26 corrects the robot route information 32.

Next, the control unit 2 causes the traveling control section 21 to move or stop the robot body 1 (a movement/stop step: the step ST8). At this movement/stop step (the step ST8), based on the robot route information 32 set at the route information production/updating step (the step ST7), the robot body 1 is moved along a track along such a route, or the robot body 1 having been moved along the route is stopped. The traveling control section 21 drivably controls the traveling unit 3 to adjust the traveling speed of the robot body 1 or perform traveling operation such as forward/backward movement or turning, and as necessary, controls traveling of the robot body 1 such as avoidance of an obstacle detected by the front sensor or the back sensor or temporal stop of the robot body 1. Moreover, in a case where it is determined that traveling cannot be continued due to some kinds of inconsistency in the produced occupancy grid map M, various types of region information, the robot route information 32, the movement body route information 33, or the like, the control unit 2 may stop traveling of the robot body 1, and may continue a stop state until the map information, the region information, or the route information becomes consistent by subsequent updating or later.

Next, the control unit 2 moves the robot body 1 in coordination with the movement body 100 by the coordinated movement control section 28, thereby executing the coordinated movement (a coordinated movement execution step: the step ST9). Note that this coordinated movement execution step (the step ST9) may be skipped in a case where the conditions for executing the coordinated movement, such as a condition where the movement mode is the individual operation mode, a condition where the movement body 100 cannot be discriminated at the movement body detection step (the step ST5), and a condition where the movement body route information 33 cannot be acquired, are not satisfied. At the coordinated movement execution step (the step ST9), the coordinated movement control section 28 executes, based on the instruction received at the instruction receiving step (the step ST1), any movement mode of the follow-up operation mode, the task division operation mode, and the leading operation mode as described later.

Next, the control unit 2 determines whether or not action of the robot body 1 is to be continued (the step ST10). In the case of continuing the action (YES at the step ST10), the processing returns to the instruction receiving step (the step ST1), and each of the above-described steps ST1 to ST9 is repeated. In the case of not continuing the action at the step ST10 (NO at the step ST10), the control unit 2 stops operation of each section of the robot body 1 to stop the action.

Figure 9:
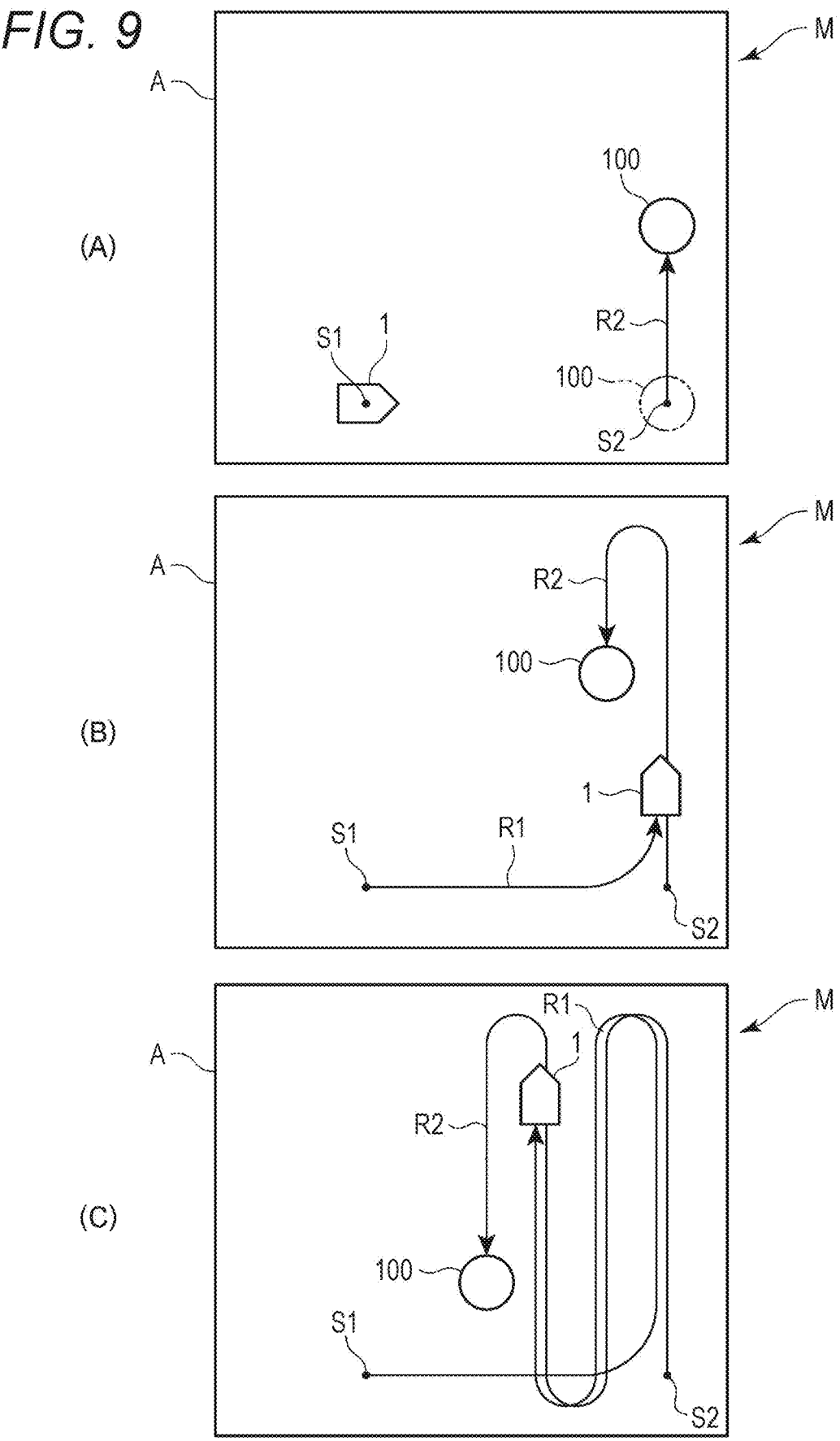
FIG. 9 is a view of follow-up operation as coordinated movement of the movement robot.
Figure 10:
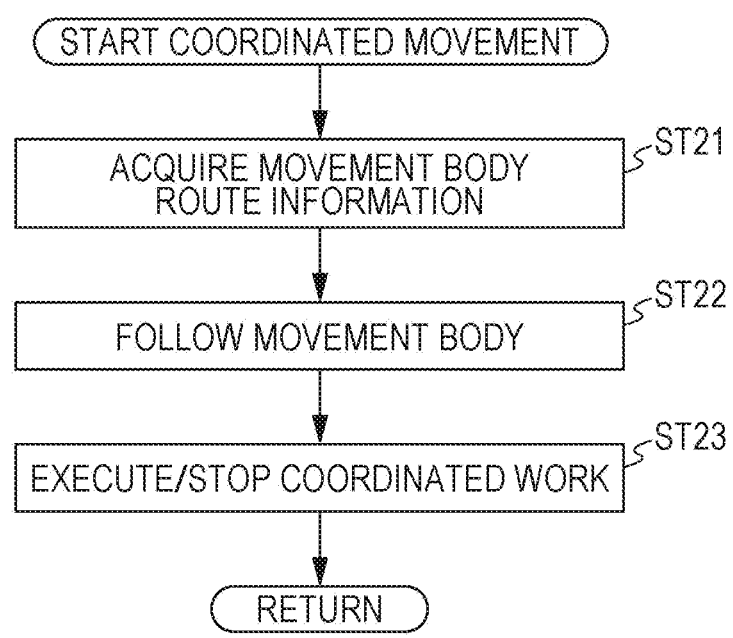
FIG. 10 is a flowchart of the follow-up operation as the coordinated movement of the movement robot.

Next, operation of the movement robot in the follow-up operation mode will be described with reference to FIGS. 9 and 10. FIG. 9 is a view of follow-up operation as the coordinated movement of the movement robot. FIG. 10 is a flowchart of the follow-up operation. In FIGS. 9(A) to 9(C), the entirety of the target space is, as a working region A, associated with the occupancy grid map M, and the working region A is stored as the working region information 34 in the storage section 30. Moreover, movement of an object present in the target space is detected by the movement body detection section 291, such an object is discriminated as the movement body 100, and a movement route R2 of the movement body 100 is, as the movement body route information 33, associated with the occupancy grid map M. Further, a movement route R1 of the robot body 1 calculated for following the movement body 100 is, as the robot route information 32, associated with the occupancy grid map M.

First, it is assumed that the robot body 1 is located at a start point S1 at the start of action as illustrated in FIG. 9(A) and the movement body 100 has moved from a start point S2 along the movement route R2 within predetermined time after the start. At this point, as illustrated in FIG. 10, the coordinated movement control section 28 of the control unit 2 acquires the movement route R2 of the movement body 100 based on the movement body route information 33 stored in the storage section 30 at the above-described route information production/updating step (the step ST7) (a movement body route information acquisition step: a step ST21). Next, based on the robot route information 32 stored in the storage section 30 at the route information production/updating step (the step ST7), the coordinated movement control section 28 starts traveling along the movement route R1 of the robot body 1 to follow the movement body 100 (a movement body follow-up step: ST22). Until reaching the movement route R2 of the movement body 100 after the start of traveling, the robot body 1 moves along the movement route R1 as the shortest distance to the movement route R2 as illustrated in FIG. 9(B). During follow-up of the movement body 100, the movement route R1 of the robot body 1 is updated as needed to subsequently overlap with the movement route R2 of the movement body 100 as illustrated in FIG. 9(C), and the robot body 1 continuously follows the movement body 100 along the movement route R1.

The robot body 1 is moved to follow the movement body 100, and the control unit 2 controls the working unit 7 by the work control section 24 to execute or stop a predetermined coordinated work (a coordinated work execution/stop step: ST23). That is, in the follow-up operation mode, the work is executed in coordination with the movement body 100 while the robot body 1 is following the movement body 100. For example, in a case where the movement robot is the cleaning robot and the movement body 100 is another cleaning robot, a work in which the robot body 1 executes wiping for the floor surface for which suction has been performed by the movement body 100 may be an example of the coordinated work. In this case, the movement body 100 may be a person, and the robot body 1 may execute suction or wiping for the floor surface after the person has performed sweeping. Note that in a case where the movement robot is one other than the cleaning robot, a coordinated work performed during follow-up of, e.g., other working robots, persons, or automobiles can be selected as necessary, and a proper work can be executed in various fields such as security, transport, guide, nursing-care, and agriculture.

Figure 11:
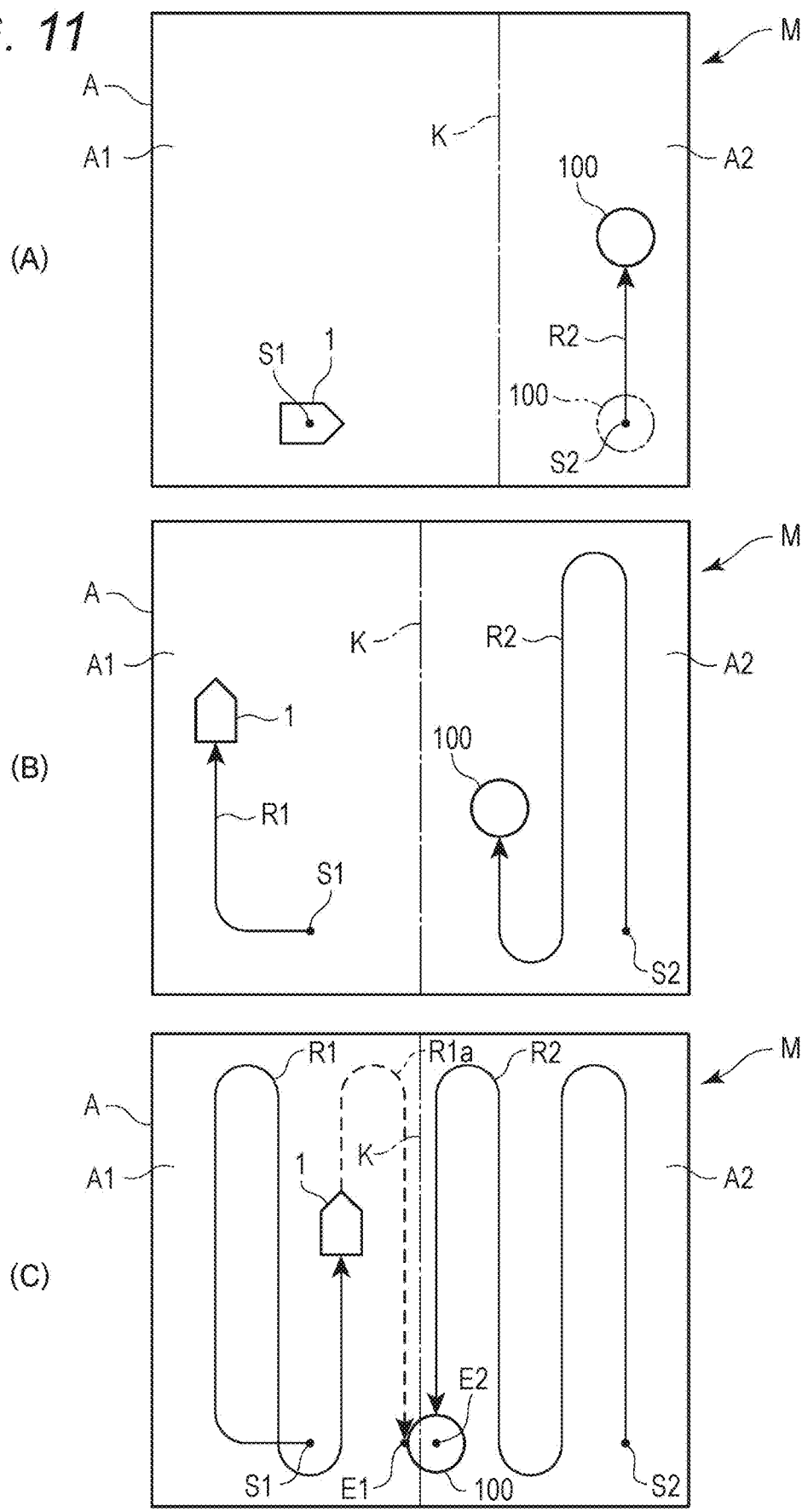
FIG. 11 is a view of task division operation as the coordinated movement of the movement robot.
Figure 12:
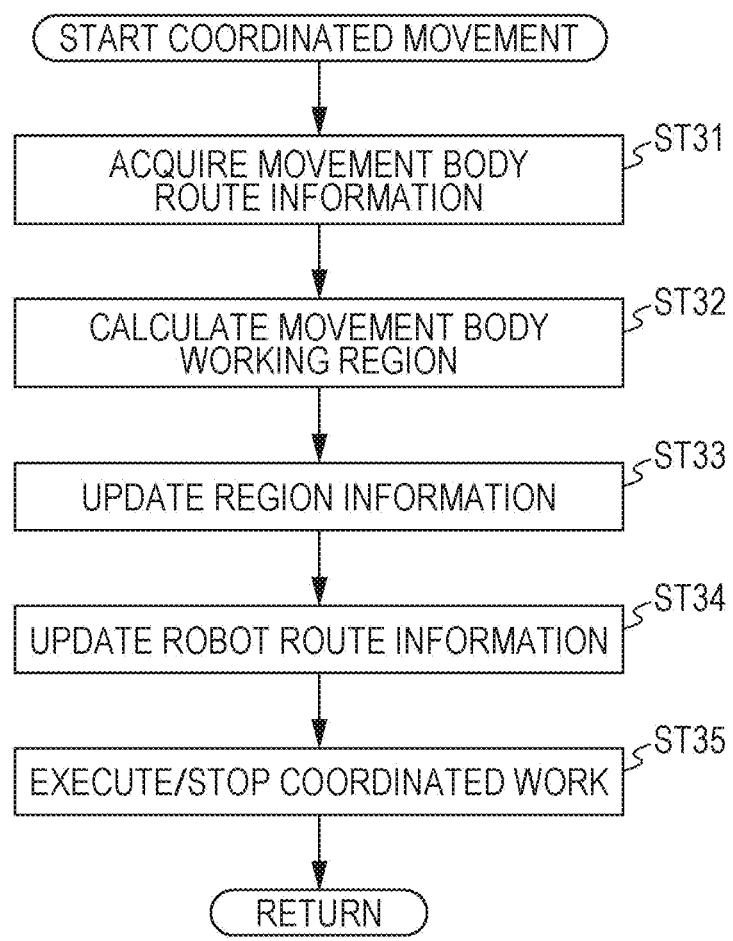
FIG. 12 is a flowchart of the task division operation as the coordinated movement of the movement robot.

Next, operation of the movement robot in the task division operation mode will be described with reference to FIGS. 11 and 12. FIG. 11 is a view of task division operation as the coordinated movement of the movement robot. FIG. 12 is a flowchart of the task division operation. In FIGS. 11(A) to 11(C), the entirety of the target space is, as the working region A, associated with the occupancy grid map M, and the working region A is stored as the working region information 34 in the storage section 30. As indicated by a boundary line K as a chain line in FIG. 11, the working region A is divided into a working region A1 where the robot body 1 executes the work and a working region A2 where the movement body 100 has executed the work. That is, the movement route R2 of the movement body 100 detected by the movement body detection section 291 is, as the movement body route information 33, associated with the occupancy grid map M, a region where the movement body 100 has already executed the work along the movement route R2 is the working region A2, and the movement route R1 of the robot body 1 calculated for executing the work such that the work is divided between the robot body 1 and the movement body 100 is, as the robot route information 32, associated with the occupancy grid map M.

First, it is assumed that the robot body 1 is located at the start point S1 at the start of action as illustrated in FIG. 11(A) and the movement body 100 has moved from the start point S2 along the movement route R2 within the predetermined time after the start. At this point, as illustrated in FIG. 12, the coordinated movement control section 28 of the control unit 2 acquires the movement route R2 of the movement body 100 based on the movement body route information 33 stored in the storage section 30 at the above-described route information production/updating step (the step ST7) (a movement body route information acquisition step: a step ST31). Next, the region information control section 27 obtains, by arithmetic processing, the working region A2 of the movement body 100 based on the movement route R2 of the movement body 100 (a movement body working region calculation step: ST32), and takes the working region A2 as a worked region to update the working region information 34 of the storage section 30 (a region information updating step: ST33). Specifically, a region where the movement body 100 has moved in the occupancy grid map M is taken as the worked region as the working region A2, and other regions are taken as the working region A1 of the robot body 1. When the movement route R2 of the movement body 100 varies over time, the working region information 34 including the boundary line K and the working regions A1, A2 is further updated accordingly.

Next, the route control section 26 updates the movement route R1 (the robot route information 32) of the robot body 1 according to the working region A1 of the robot body 1 (a robot route information updating step: ST34), and the control unit 2 starts traveling of the robot body 1 along the movement route R1. At this point, the movement route R1 of the robot body 1 is set in a direction apart from the movement route R2 of the movement body 100 as illustrated in FIG. 11(B), and is set to gradually approach the movement route R2 of the movement body 100 as illustrated in FIG. 11(C). When the movement body 100 is stopped at an end point E2, the working region A1 of the robot body 1 and an end point E1 of the movement route R1 are set such that there is no non-working region across the entirety of the target space. That is, for dividing the work between the robot body 1 and the movement body 100 in the occupancy grid map M, the route control section 26 determines the movement route R1 of the robot body 1 such that the movement routes R1, R2 do not overlap with each other as much as possible and no non-working region is present.

The robot body 1 moves in a route different from that of the movement body 100 as described above, and the control unit 2 controls the working unit 7 by the work control section 24 to execute or stop the predetermined coordinated work (a coordinated work execution/stop step: ST35). That is, in the task division operation mode, the working regions A1, A2 are divided between the robot body 1 and the movement body 100 while the movement robot executes the work in coordination with the movement body 100. Such coordinated work may be the same work performed by movement robot and the movement body 100, or may be different works. Moreover, as described above, the coordinated work executed by the movement robot and the movement body 100 can execute a proper work in various fields such as cleaning, security, transport, guide, nursing-care, and agriculture.

Figure 13:
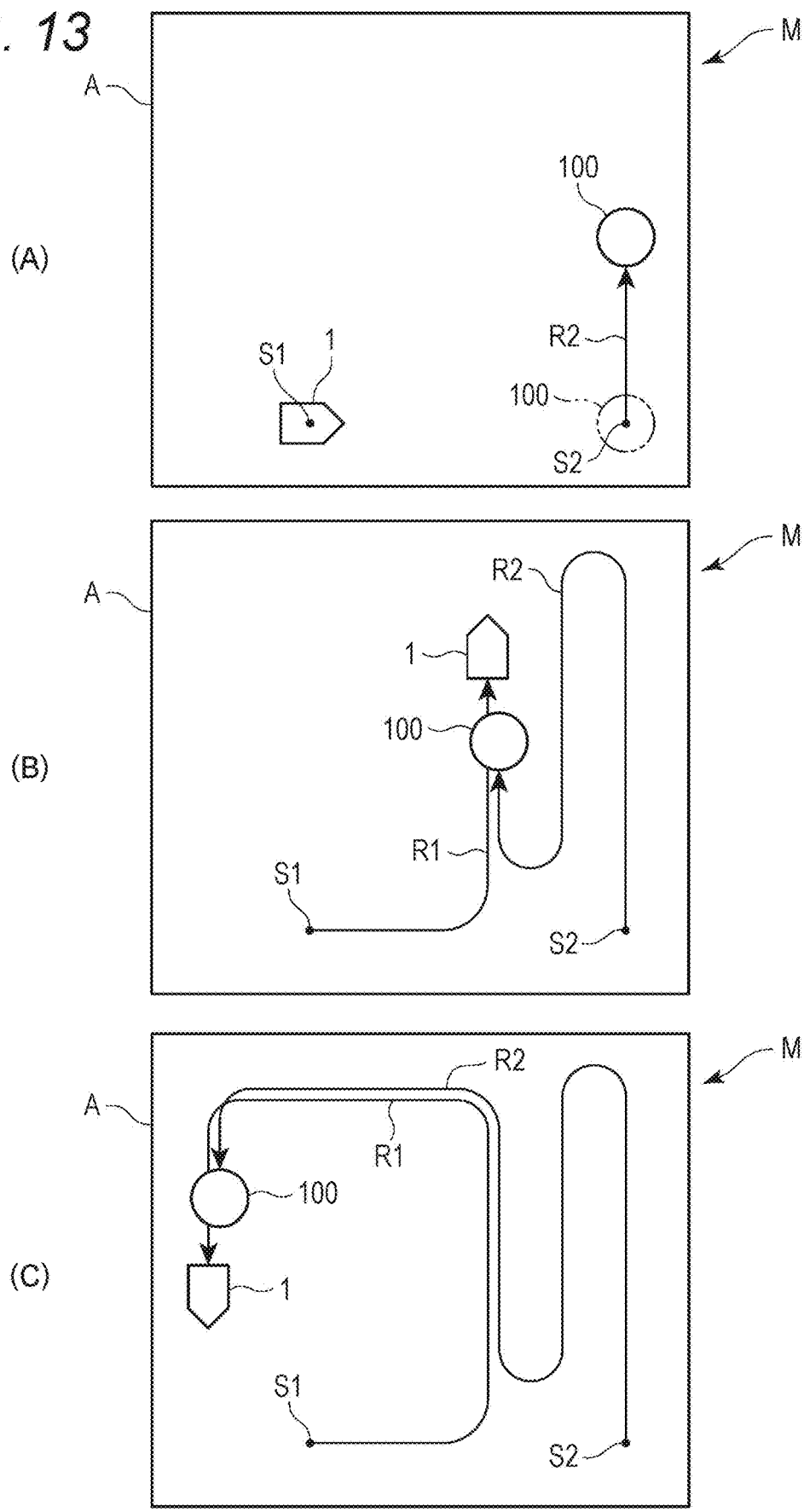
FIG. 13 is a view of leading operation as the coordinated movement of the movement robot.
Figure 14:
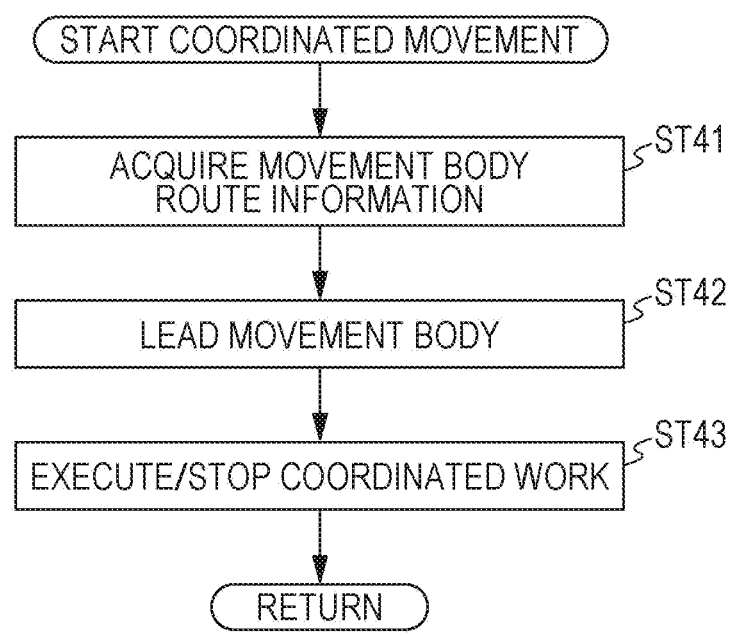
FIG. 14 is a flowchart of the leading operation as the coordinated movement of the movement robot.

Next, operation of the movement robot in the leading operation mode will be described with reference to FIGS. 13 and 14. FIG. 13 is a view of leading operation as the coordinated movement of the movement robot. FIG. 14 is a flowchart of the leading operation. In FIGS. 13(A) to 13(C), the entirety of the target space is, as the working region A, associated with the occupancy grid map M, and the working region A is stored as the working region information 34 in the storage section 30. Moreover, movement of an object present in the target space is detected by the movement body detection section 291, such an object is discriminated as the movement body 100, and the movement route R2 of the movement body 100 is, as the movement body route information 33, associated with the occupancy grid map M. Further, the movement route R1 of the robot body 1 calculated for leading the movement body 100 is, as the robot route information 32, associated with the occupancy grid map M.

First, it is assumed that the robot body 1 is located at the start point S1 at the start of action as illustrated in FIG. 13(A) and the movement body 100 has moved from the start point S2 along the movement route R2 within the predetermined time after the start. At this point, as illustrated in FIG. 13, the coordinated movement control section 28 of the control unit 2 acquires the movement route R2 of the movement body 100 based on the movement body route information 33 stored in the storage section 30 at the above-described route information production/updating step (the step ST7) (a movement body route information acquisition step: a step ST41). Next, based on the robot route information 32 stored in the storage section 30 at the route information production/updating step (the step ST7), the coordinated movement control section 28 starts traveling along the movement route R1 of the robot body 1 to lead the movement body 100 (a movement body leading step: ST42). Until reaching the front of the movement route R2 of the movement body 100 after the start of traveling, the robot body 1 moves along the movement route R1 as the shortest distance as illustrated in FIG. 13(B). As illustrated in FIG. 13(C), while the robot body 1 is leading the movement body 100, the movement route R1 is updated as needed such that the movement route R2 of the movement body 100 subsequently overlaps with the movement route R1 of the robot body 1, and the traveling unit 3 of the robot body 1 is drivably controlled. At this point, it is determined whether the movement route R2 of the movement body 100 overlaps with the movement route R1 of the robot body 1 or deviates from the movement route R1 of the robot body 1. The movement robot may include an informing unit configured to inform the movement body 100 via light, sound, or communication when it is determined that the movement route R2 deviates from the movement route R1.

The robot body 1 is moved to lead the movement body 100, and the control unit 2 controls the working unit 7 by the work control section 24 to execute or stop the predetermined coordinated work (a coordinated work execution/stop step: ST43). That is, in the leading operation mode, the robot body 1 executes the work in coordination with the movement body 100 while leading the movement body 100. As described above, the same work may be, as the coordinated work, performed by the movement robot and the movement body 100, or different works may be performed. Moreover, the coordinated work executed by the movement robot and the movement body 100 can execute a proper work in various fields such as cleaning, security, transport, guide, nursing-care, and agriculture.

Figure 15:
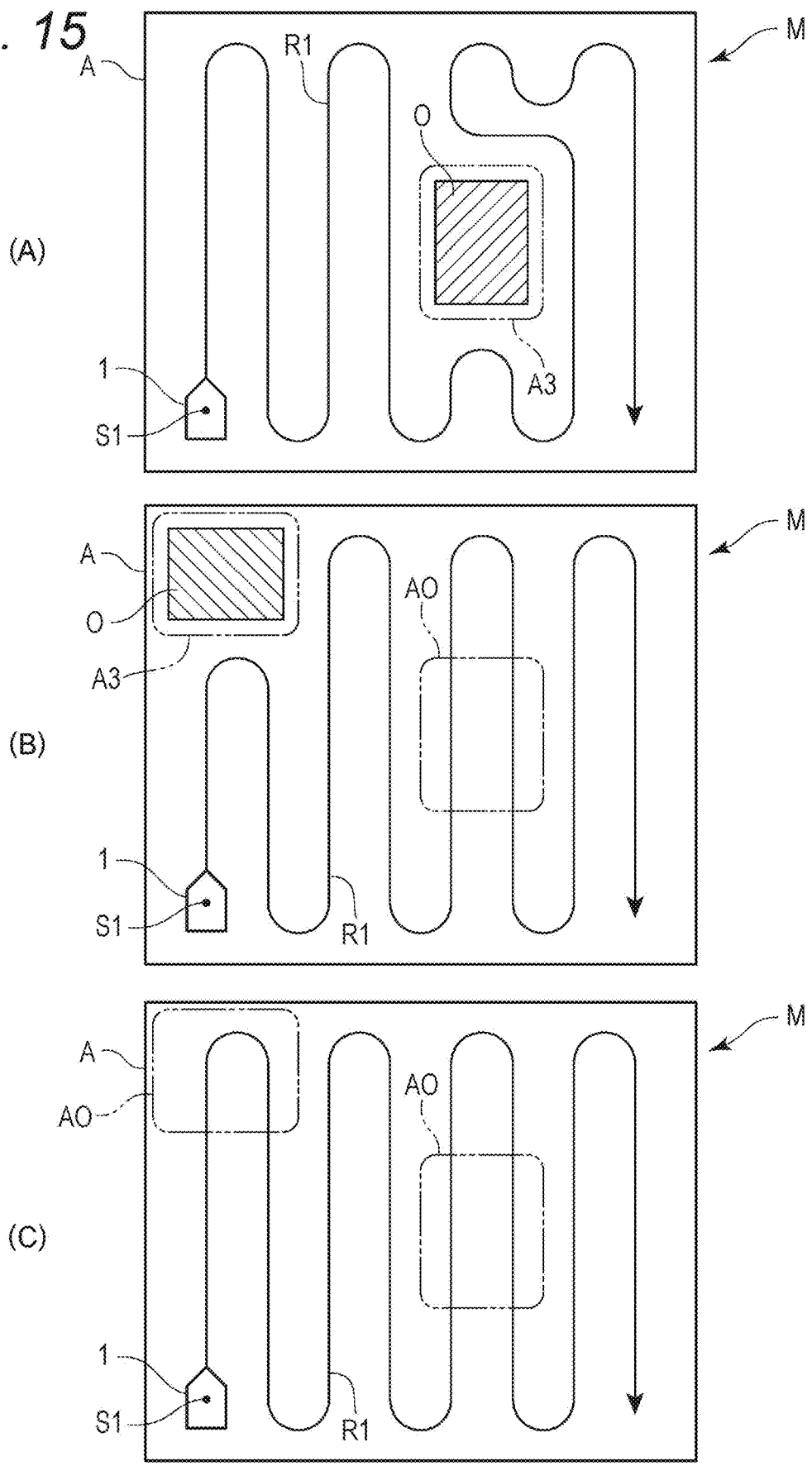
FIG. 15 is a view of other types of operation of the movement robot.
Figure 16:
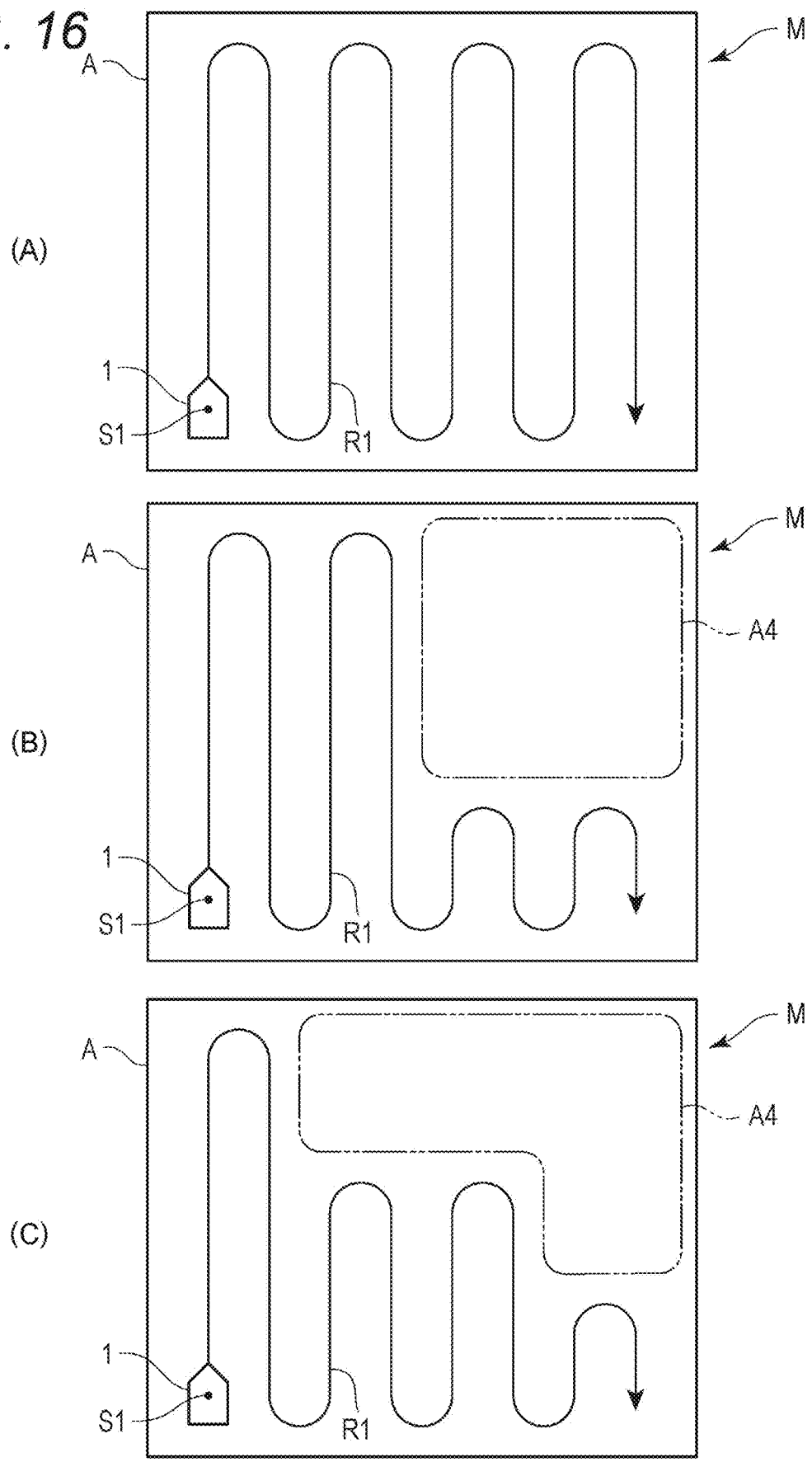
FIG. 16 is a view of still other types of operation of the movement robot.

Next, operation of the movement robot executed simultaneously with or independently of any movement mode of the follow-up operation mode, the task division operation mode, and the leading operation mode as described above will be described with reference to FIGS. 15 and 16. FIG. 15 is a view of other types of operation of the movement robot, and is a view of the operation of detecting a change in the working region to update the movement route R1 of the robot body 1 to move the robot body 1 in a case where the object O has moved. FIG. 16 is a view of still other types of operation of the movement robot, and is a view of the operation of updating the movement route R1 of the robot body 1 to move the robot body 1 in a case where the exceptional region excluded from the work target by the user is present.

In FIGS. 15(A) to 15(C), the entirety of the target space is, as the working region A, associated with the occupancy grid map M, and the working region A is stored as the working region information 34 in the storage section 30. Moreover, at the start of action, the periphery of the object O present in the target space is a non-workable region as illustrated in FIG. 15(A). Thus, such a region is associated with the occupancy grid map M as an exceptional region A3 excluded from the work target, and the exceptional region information 35 is stored in the storage section 30. In the occupancy grid map M having the working region A and the exceptional region A3 as described above, the movement route R1 of the robot body 1 is set so that the robot body 1 can move far and wide across the entirety of the working region A excluding the exceptional region A3.

Next, during traveling of the robot body 1 or at the start of subsequent action, in a case where the object O as the movable body is moving as illustrated in FIG. 15(B), when the working region information change detection section 272 detects movement of the object O, the working region information storage section 271 updates the working region information 34 according to the location of the object O after movement, and deletes the old exceptional region A3 to rewrite the working region information 34 as a non-working workable region AO. In addition, the exceptional region information storage section 273 associates the new exceptional region A3 with the occupancy grid map M to rewrite the exceptional region information 35. When the region information is updated as described above, the route control section 26 updates the movement route R1 of the robot body 1 based on the rewritten working region information 34, and the control unit 2 causes the robot body 1 to travel along the movement route R1. Next, in a case where the object O as the movable body is no longer present as illustrated in FIG. 15(C), when the working region information change detection section 272 detects such a state, the working region information storage section 271 updates the working region information 34, and deletes the old exceptional region A3 to rewrite the working region information 34 as a non-working workable region AO. When the region information is updated as described above, the route control section 26 updates the movement route R1 of the robot body 1 based on the rewritten working region information 34, and the control unit 2 causes the robot body 1 to travel along the movement route R1.

In FIGS. 16(A) to 16(C), the entirety of the target space is, as the working region A, associated with the occupancy grid map M, and the working region A is stored as the working region information 34 in the storage section 30. Moreover, at the start of action, the movement route R1 of the robot body 1 is set so that the robot body 1 can move far and wide across the entirety of the working region A in the occupancy grid map M as illustrated in FIG. 16(A). At this point, in a case where the instruction received from the user at the instruction receiving step (the step ST1) is the region excluded from the work target, the exceptional region information storage section 273 associates, as illustrated in FIG. 16(B), an exceptional region A4 with the occupancy grid map M to update the exceptional region information 35. When the region information is updated as described above, the route control section 26 updates the movement route R1 of the robot body 1 based on the updated working region information 34 and the updated exceptional region information 35, and the control unit 2 causes the robot body 1 to travel along the movement route R1. Next, as illustrated in FIG. 16(C), in a case where the exceptional region A4 further changes according to the instruction received at the instruction receiving step (the step ST1), the exceptional region information storage section 273 updates the exceptional region information 35, and the route control section 26 updates the movement route R1 of the robot body 1. Moreover, in a case where an instruction for canceling the exceptional region A4 is received during traveling of the robot body 1, a region has been the exceptional region A4 once becomes a non-working workable region. Thus, the working region information storage section 271 updates the working region information 34, and the route control section 26 updates the movement route R1 of the robot body 1.

According to the present embodiment, the following features/advantageous effects can be provided.

(1) The control unit 2 of the movement robot stores the movement route R1 of the movement robot itself as the robot route information 32, and stores the movement route R2 of the movement body 100 detected by the movement body detection section 291 as the movement body route information 33. Based on the robot route information 32 and the movement body route information 33, the coordinated movement control section 28 moves the robot body 1 in coordination with the movement body 100 so that the robot body 1 can be efficiently moved relative to the movement body 100 and various types of operation can be executed according to motion of the movement body 100. Thus, a utilization area of the movement robot can be expanded. Moreover, the movement body detection section 291 detects the movement body 100 so that coordinated operation for the movement body 100 can be reliably executed.

(2) As illustrated in FIGS. 9 and 10, the coordinated movement control section 28 moves the robot body 1 such that the robot body 1 subsequently overlaps with the movement route R2 of the movement body 100, and causes the robot body 1 to follow the movement body 100. Thus, the robot body 1 can execute the follow-up operation of following the movement body 100 from the back thereof. That is, the movement robot does not merely move toward the movement body 100, but subsequently moves along the route in which the movement body 100 has moved. Thus, e.g., the work coordinated with the movement body 100 can be executed.

(3) As illustrated in FIGS. 11 and 12, the coordinated movement control section 28 moves the robot body 1 such that the robot body 1 does not overlap with the movement route R2 of the movement body 100, moves the robot body 1 in the predetermined working region A1, and performs the work such that the work is divided between the robot body 1 and the movement body 100 moving in the working region A2. Thus, the robot body 1 can execute the divided work not overlapping with that by the movement body 100. That is, in the predetermined working region A, the robot body 1 moves in the movement route R1 different from the movement route R2 in which the movement body 100 has moved (or is moving), and therefore, the robot body 1 can perform the coordinated operation while the work is divided between the robot body 1 and the movement body 100.

(4) As illustrated in FIGS. 13 and 14, the coordinated movement control section 28 causes the robot body 1 to move and lead the movement body 100 such that the movement body 100 moves to subsequently overlap with the movement route R1 of the robot body 1, and therefore, the leading operation of leading the movement body 100 can be executed by the robot body 1. That is, the robot body 1 is moved while it is determined that the movement body 100 follows the robot body 1, and therefore, the work coordinated with the movement body 100 can be executed while the robot body 1 is leading the movement body 100.

(5) The object change detection section 292 compares the new map and the old map to detect a change in the presence or absence of the object O at the periphery of the robot body 1, and therefore, operation of the robot body 1 can be changed corresponding to a change in the working region A. For example, in a case where the movable object O is moved by the worker, the region A3 through which the object O cannot pass is the passable region AO, and therefore, the robot route information 32 can be updated such that the object O passes through such a region AO and the robot body 1 can be moved.

(6) The map production section 25 produces the wide area map 311 and the narrow area map 312. Thus, while the entirety of the working region A can be recognized based on the low-resolution broad wide area map 311 associated with the robot route information 32 and the movement body route information 33, a change in the presence or absence of the surrounding object O can be reliably detected based on the narrow area map 312 used for detecting a change in the presence or absence of the object O at the periphery of the robot body 1 by the object change detection section 292. Moreover, a large amount of the narrow area map 312 having a smaller data amount than that of the wide area map 311 can be stored in the storage section 30.

(7) The working region information storage section 271 stores, in the storage section 30, the working region information 34 indicating the workable region in association with the occupancy grid map M, and the working region information change detection section 272 detects a change in the working region information 34 by comparison between the new map and the old map. Thus, operation of the robot body 1 can be changed corresponding to a change in the working region information 34. For example, in a case where the location of the object O has been moved by the worker, the region A3 through which the work cannot be performed so far is changed to the passable region AO, and therefore, the robot body 1 can be moved by the traveling unit 3 such that the work is performed in the region AO.

(8) The map production section 25 produces, in addition to the wide area map 311, the narrow area map 312 used for detecting a change in the working region information 34 by the working region information change detection section 272, and therefore, a change in the working region information 34 can be reliably detected. Moreover, a large amount of the narrow area map 312 having a smaller data amount than that of the wide area map 311 can be stored in the storage section 30.

(9) The exceptional region information storage section 273 stores, in the storage section 30, the exceptional region information 35 in association with the occupancy grid map M, and therefore, operation of the robot body 1 can be changed for the region A4 excluded from the work target by the exceptional region information 35. For example, in a case where the work has been already performed by the worker in a certain region, the exceptional region information 35 is stored such that such a region A4 is excluded from the work target, and therefore, the robot body 1 can be operated such that the work is not performed in the region A4.

Variations of Embodiment

Note that the present invention is not limited to the above-described embodiment, and variations, modifications, and the like within a scope in which the object of the present invention be accomplished are included in the present invention.

For example, in the above-described embodiment, a specific example has not been described as the movement body, but the movement body may be a movement robot such as a service robot or a home robot. More specifically, examples may include a cleaning robot, a security robot, a transport robot, and a guide robot. Further, the movement body may be a person, or may be a self-driving vehicle or a service vehicle. Further, a movement area of the movement body is not limited to a two-dimensional planar space, and may be a three-dimensional space. In this case, the movement body may be a flying object such as a drone. That is, in the above-described embodiment, the example using 2D-SLAM has been described as the SLAM technique, but a map generation system of the present invention is also applicable to 3D-SLAM targeted for a three-dimensional space. Moreover, in the above-described embodiment, the occupancy grid map M is produced as the map, but the map used for the movement robot of the present invention is not limited to the occupancy grid map. As long as the map can be utilized for the SLAM technique, any map can be utilized.

In the above-described embodiment, the coordinated movement control section 28 executes, based on the instruction received at the instruction receiving step (the step ST1), any movement mode of the follow-up operation mode, the task division operation mode, and the leading operation mode. However, all of the follow-up operation mode, the task division operation mode, and the leading operation mode are not necessarily executed, and one or more movement modes of these modes may be executed. Moreover, in a case where no instruction has been received at the instruction receiving step (the step ST1), action may be taken in a preset individual movement mode for the robot body 1 alone without movement in coordination with the movement body 100. Further, in a case where a new instruction has been received at the instruction receiving step (the step ST1) during movement in a certain movement mode, action may be taken after the movement mode has been switched to the movement mode based on the new instruction.

In the above-described embodiment, the robot body 1 of the movement robot includes the control unit 2, and the map production section 25 and the storage section 30 are provided at the control unit 2. However, e.g., a map production unit configured to produce the occupancy grid map M and a storage unit configured to store the occupancy grid map M may be provided not only at the robot body 1 but also at other types of equipment communicable with the movement body, and the robot body 1 may be self-propelled based on the occupancy grid map M produced by other types of equipment. Moreover, the movement robot includes the detection unit. However, the detection unit may be provided not only at the robot body 1 but also at other types of equipment. Thus, the detection information on the movement area and the movement body may be received by other types of equipment. Using such detection information, the map may be produced, the movement route of the movement body may be produced, and the region information may be produced.

In the above-described embodiment, based on the occupancy grid map M produced by the map production section 25, the old map and the new map are compared with each other to detect the movement body 100 by the movement body detection section 291. However, in addition to such a method, a movement body detection section configured to directly detect the movement body may be provided. There is an example including, as the movement body detection section, an image capturing unit such as a camera, an image processing unit configured to process an image captured by the image capturing unit, and an analysis unit configured to detect movement of an object based on an image processing result. According to such a configuration, the movement body detection section configured to directly detect the movement body at the periphery of the robot body 1 is provided so that the movement body can be accurately detected and the coordinated operation for the movement body can be reliably executed. Further, the movement body detection section may directly or indirectly communicate with the movement body to detect the movement body, or a detection target unit such as a beacon may be provided at the movement body and may be optically or electrically read for detecting the movement body.

In the above-described embodiment, the map information 31 as the occupancy grid map M produced by the map production section 25 includes two types of maps with different resolutions, i.e., the wide area map 311 and the narrow area map 312. However, the map information 31 may include only the wide area map containing the entirety of the movement area, and the wide area map may have a high resolution. Moreover, the map information 31 is not limited to these two types of the wide area map 311 and the narrow area map 312, and may include three or more types of maps with different resolutions. Further, the map information is not limited to a resolution difference, and may include multiple maps according to various types of information such as space height information, wall surface information, and object three-dimensional shape information.

INDUSTRIAL APPLICABILITY

As described above, the present invention can suitably utilized for a movement robot configured so that various types of operation can be executed according to motion of other objects or a movement body and a utilization area can be expanded accordingly.

LIST OF REFERENCE NUMERALS 1 robot body
2 control unit
3 traveling unit (movement unit)
4 detection unit
25 map production section
26 route control section (robot route information storage section, movement body route information storage section)
27 region information control section
28 coordinated movement control section
29 object detection control section
30 storage section
31 map information
32 robot route information
33 movement body route information
34 working region information
35 exceptional region information
100 movement body
271 working region information storage section
272 working region information change detection section
273 exceptional region information storage section
291 movement body detection section
292 object change detection section
311 wide area map
312 narrow area map
A working region (movement area)
M, M1, M2 occupancy grid map (map)
O object
R1, R2 movement route

The invention claimed is:

1. A movement robot comprising:
a robot body;
a driving mechanism configured to move the robot body;
a detector configured to detect a distance to a surrounding object in a movement area of the robot body and a direction of the object;
an instruction receiver configured to receive an instruction to perform a certain operation mode selected from two or more operation modes for the robot body; and
a controller configured to control the driving mechanism and the detector,
wherein the controller includes
a storage configured to store detection information detected by the detector in chronological order,
a map producer configured to produce, and update as needed, a map of a periphery of the robot body based on the detection information stored in the storage to store the map in the storage,
a movement body detector configured to detect a movement body different from the robot body by comparing a new map produced by the map producer and an old map stored in the storage,
a robot route information storage configured to associate the map produced by the map producer with robot route information indicating a movement route of the robot body to store the map in the storage,
a movement body route information storage configured to associate the map produced by the map producer with movement body route information indicating a movement route of the movement body to store the map in the storage, and
a coordinated movement control section controller configured to move the robot body in coordination with the movement body based on the robot route information and the movement body route information, wherein
upon receipt of the instruction related to perform the certain operation mode by the instruction receiver, the coordinated movement controller acquires the movement route of the movement body and thereafter performs the certain operation mode by moving the robot body in coordination with the movement body based on the movement body route information.

2. The movement robot according to claim 1, wherein the coordinated movement controller moves the robot body by the driving mechanism such that the movement route of the robot body subsequently overlaps with the movement route of the movement body, thereby causing the robot body to move and follow the movement body.

3. The movement robot according to claim 1, wherein the coordinated movement controller moves the robot body by the driving mechanism such that the movement route of the robot body does not overlap with the movement route of the movement body, thereby moving the robot body in a predetermined movement region such that a work is divided between the robot body and the movement body.

4. The movement robot according to claim 1, wherein the coordinated movement controller determines whether or not the movement route of the movement body subsequently overlaps with the movement route of the robot body, and in a case where it is determined that the movement route of the movement body overlaps with the movement route of the robot body, moves the robot body by the driving mechanism such that the robot body leads the movement body.

5. The movement robot according to claim 1, wherein the controller includes an object change detector configured to compare a new map produced by the map producer and an old map stored in the storage to detect a change in a presence or absence of the object at the periphery of the robot body.

6. The movement robot according to claim 5, wherein the map producer produces a low-resolution broad wide area map associated with the robot route information and the movement body route information and a high-resolution narrow area map used for detecting the change in the presence or absence of the object at the periphery of the robot body by the object change detector.

7. The movement robot according to claim 1, wherein the controller includes a working region information storage configured to associate the map produced by the map producer with working region information indicating a workable region to store the map in the storage, and a working region information change detector configured to compare the new map produced by the map producer and the old map stored in the storage to detect a change in the working region information.

8. The movement robot according to claim 7, wherein the map producer produces a low-resolution broad wide area map including the robot route information and the movement body route information and a high-resolution narrow area map used for detecting the change in the working region information by the working region information change detector.

9. The movement robot according to claim 1, wherein the controller includes an exceptional region information storage configured to associate the map produced by the map producer with exceptional region information indicating a region excluded from a work target to store the map in the storage.

10. The movement robot according to claim 1, wherein the two or more operation modes include:

a follow-up operation mode in which the robot body moves and follows the movement body;

a task division operation mode in which the robot body moves in a predetermined movement region different from another predetermined movement region in which the movement body moves; and a leading operation mode in which the robot body leads the movement body.

\* \* \* \* \*